US012529736B2

(12) United States Patent
Flansberry et al.

(10) Patent No.: US 12,529,736 B2
(45) Date of Patent: Jan. 20, 2026

(54) VECTORIAL MAGNETOMETER AND ASSOCIATED METHOD FOR DISTINGUISHING SPIN POPULATION TRANSFER IN DIFFERENT CRYSTALLINE DEFECT ORIENTATIONS

(71) Applicant: SB TECHNOLOGIES INC., Sherbrooke (CA)

(72) Inventors: Zackary Flansberry, Sherbrooke (CA); Olivier Bernard, Sherbrooke (CA); Vincent Halde, Sherbrooke (CA); David Roy-Guay, Sherbrooke (CA); Guillaume Duclos-Cianci, Sherbrooke (CA)

(73) Assignee: SB TECHNOLOGIES INC., Sherbrooke (CA)

( * ) Notice: Subject to any disclaimer, the term of this patent is extended or adjusted under 35 U.S.C. 154(b) by 206 days.

(21) Appl. No.: 18/006,629

(22) PCT Filed: Jun. 26, 2021

(86) PCT No.: PCT/CA2021/051038
§ 371 (c)(1),
(2) Date: Jan. 24, 2023

(87) PCT Pub. No.: WO2022/020943
PCT Pub. Date: Feb. 3, 2022

(65) Prior Publication Data
US 2023/0314536 A1    Oct. 5, 2023

Related U.S. Application Data

(60) Provisional application No. 63/056,738, filed on Jul. 27, 2020.

(51) Int. Cl.
*G01R 33/26* (2006.01)
*G01R 33/32* (2006.01)

(52) U.S. Cl.
CPC ........... *G01R 33/26* (2013.01); *G01R 33/323* (2013.01)

(58) Field of Classification Search
CPC ....... G01R 33/26; G01R 33/323; G01R 33/24
See application file for complete search history.

(56) References Cited

U.S. PATENT DOCUMENTS 8,547,090 B2    10/2013    Lukin et al.
8,885,301 B1    11/2014    Heidmann
8,947,080 B2     2/2015    Lukin et al.
(Continued)

FOREIGN PATENT DOCUMENTS

CA    3104874       1/2020
WO    2017173548   10/2017
WO    2019239137   12/2019

*Primary Examiner* — Reena Aurora
(74) *Attorney, Agent, or Firm* — Alexandre Daoust; Norton rose fulbright Canada LLP

(57) ABSTRACT

The vectorial magnetometer and associated methods can allow to distinguish the relative superposed amplitudes associated to different spin populations based on the known proportions of the Rabi attenuation in the different characteristic orientations of the spin populations due to application of different pulse parameters which can be specifically selected to create a contrast between the attenuation proportions stemming from the different spin populations.

22 Claims, 17 Drawing Sheets

(56) References Cited

U.S. PATENT DOCUMENTS

| | | | |
|---|---|---|---|
| 9,245,551 B2 | 1/2016 | El Hallak et al. | |
| 9,551,763 B1 | 1/2017 | Hahn et al. | |
| 9,664,767 B2 | 5/2017 | Cappellaro et al. | |
| 10,564,231 B1* | 2/2020 | Mandeville | G01R 33/26 |
| 2016/0223621 A1* | 8/2016 | Kaup | G01R 33/032 |
| 2016/0356863 A1* | 12/2016 | Boesch | G01R 33/032 |
| 2019/0018091 A1 | 1/2019 | Lew et al. | |
| 2019/0219645 A1 | 7/2019 | Hahn et al. | |
| 2020/0300945 A1* | 9/2020 | Roy-Guay | G01R 33/0206 |

\* cited by examiner

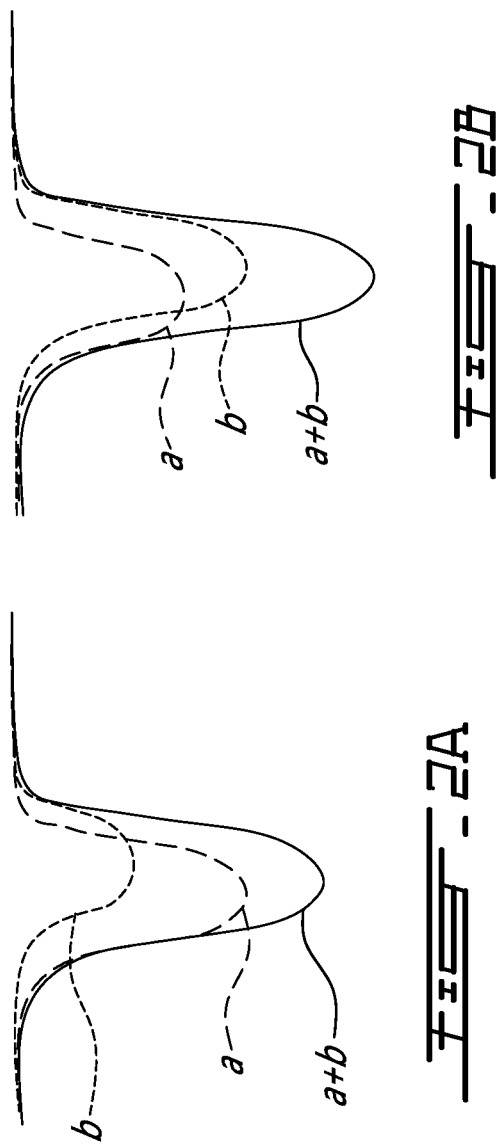

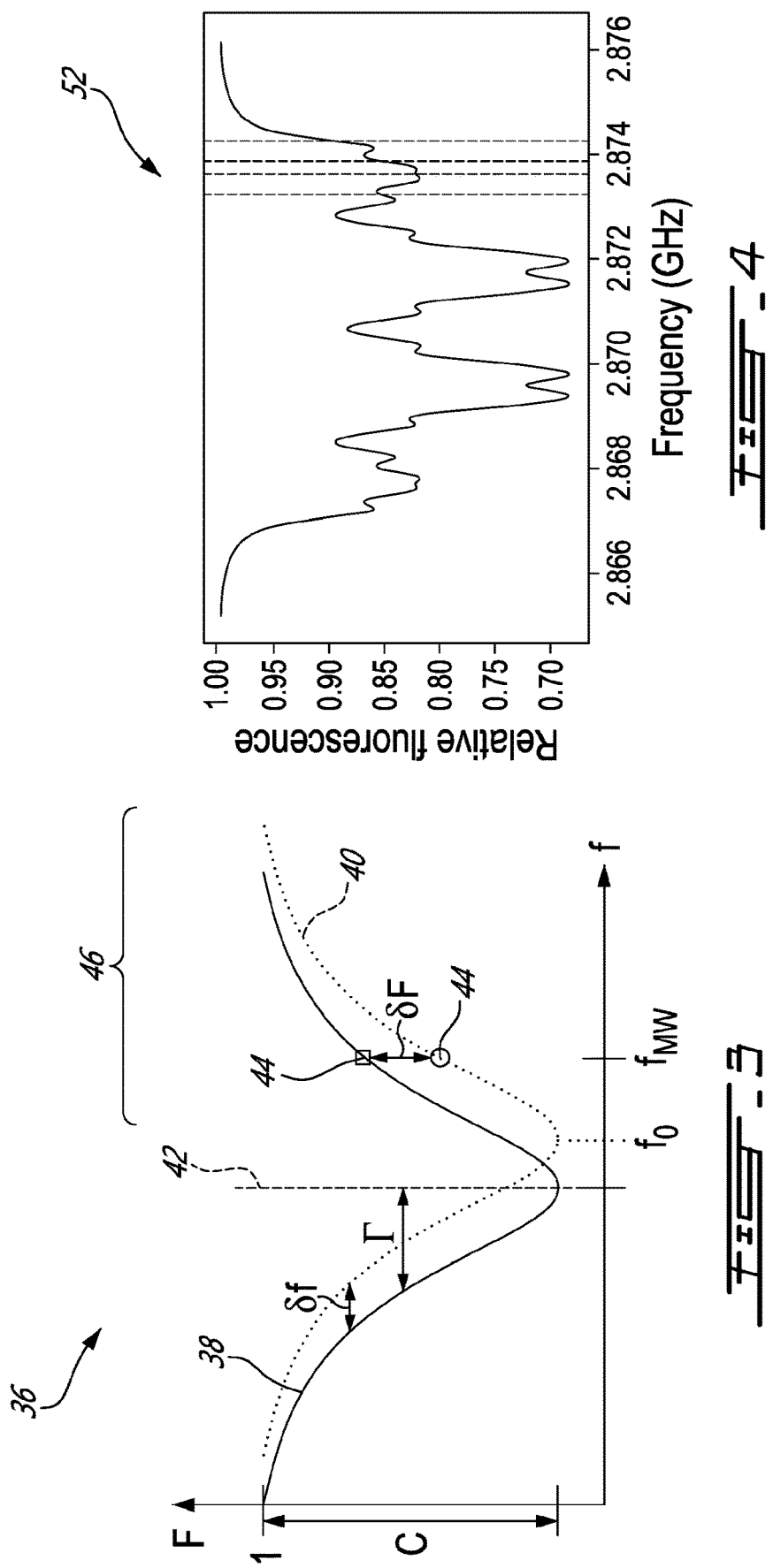

VECTORIAL MAGNETOMETER AND ASSOCIATED METHOD FOR DISTINGUISHING SPIN POPULATION TRANSFER IN DIFFERENT CRYSTALLINE DEFECT ORIENTATIONS

BACKGROUND

Some structures can have spin state systems in more than one characteristic orientations of the structure. An example is crystalline structures, where spin state systems formed by NV defects (aka NV centers), can have four characteristic defect orientations in a diamond lattice, such as schematized in FIG. 1A for instance. Diamond structures having NV defects can be industrially produced in a manner for the defects in different defect orientations to be randomly distributed in the crystalline lattice to the point of forming corresponding statistically representative populations. The spin-states systems in such structures can be sensitive to external influences, such as temperature, pressure, electric and/or magnetic field strength, in the sense that the exact (quantum) amount of energy required to stimulate a given spin population transfer can be affected by the external influence. The external influence can be perceived differently by the populations in the different orientations. In the case of NV defects, for instance, for a given external magnetic field, the perceived magnetic field strength can vary based on the given defect orientation, as a function of the varying trigonometrical projection of the magnetic field amplitude on the defects of corresponding orientations. These differences between the effect of an external influence on the defects in the different orientations can, in some cases, be detected and measured to obtain a measurement of the external influence. In the case of NV defects, this can be done optically using the optically detected magnetic resonance (ODMR) technique, for instance, and can be harnessed to determine the absolute amplitude and orientation of the external magnetic field relative to the crystalline structure orientation. Systems designed for performing this latter function are referred to as vectorial magnetometers.

More specifically, in a typical ODMR technique performed on NV defects in a diamond crystalline structure, the defects are subjected to electromagnetic excitation designed to transfer spin populations from the $m_s=|0\rangle$ state to the $m_s=|+/-1\rangle$ states (shown in FIG. 1B). The $m_s=|0\rangle$ state is fluorescent (i.e. generates light when returning to the base state after being excited to the excited state), whereas the $m_s=|+/-1\rangle$ states generate detectably less fluorescence upon returning to the base state, allowing to distinguish between the two with a precise optical intensity detector. Accordingly, depending on the proportion of spin state populations which have transferred from the $m_s=|0\rangle$ state to the $m_s=|+/-1\rangle$ states during the spin transfer step, the measured intensity of fluorescence can fluctuate. In the case of ODMR performed on NV defects, the exact value (level) of energy of the electromagnetic excitation required to transfer the spin states $m_s=|0\rangle$ state to the $m_s=|+/-1\rangle$ states is typically within the values of energy of electromagnetic waves in the microwave portion of the spectrum, and can thus be applied via one or more waveguides and a suitable microwave source.

In NV defects interrogated via ODMR, in the absence of an external magnetic field, a single "peak" diminution, or drop, in the fluorescence, such as schematized in FIG. 3, will be detected around 2.87 GHz. In NV defects, the $m_s=|+/-1\rangle$ energy levels become split from one another in the presence of an external magnetic field, meaning that the exact amount of energy, and thus the microwave frequency, required to produce the peak population transfer from $m_s=|0\rangle$ to each respective one of these states will be different when an external magnetic field is present. Accordingly, interrogating NV defects subjected to an external magnetic field with ODMR by scanning the microwave frequency across both energy levels can produce two distinct peaks. For simplicity, the expression peak will be used hereinbelow to refer to peak population transfer, independently of the type of structure in which the spin state systems are found and independently of the stimulation/detection methods.

Now, the trigonometrical projection of a given external magnetic field of a given orientation and amplitude can be different for the different orientations of the defects in the crystalline lattice, and therefore the magnetic field strength "perceived" by the defects of different orientations will be different, producing up to 8 distinct peaks in a scenario where the trigonometrical projections of the magnetic field are of significantly different amplitudes (e.g. of an energy level difference broader than the width of the peak) for each one of the four orientations.

While these techniques were satisfactory to a certain degree, there remained room for improvement. For instance, in some cases, depending on the width of the peaks, the amplitude of the external influence, and the relative orientations, a given spin population transfer stimulation at a very specific energy value (e.g. microwave frequency) can transfer spin populations of more than one orientation, and the detection or measurement of the spin population transfer can then lead to an ambiguous reading, in which it is not clear which portion of the detected transfer is associated to which one of the spin populations. Indeed, magnetic field strengths in the same order of magnitude as the Earth's magnetic field strength, for instance, may not be sufficient to clearly separate the peaks associated to different ones of NV defect orientations in a diamond lattice, and to illustrate this, an ODMR interrogation of NV defects subjected to the Earth's magnetic field at sea level is presented in FIG. 4. Some known techniques address this latter challenge by selectively applying a known external magnetic field in a manner to shift the individual peaks away from one another, for instance, but this represents a significant amount of hardware and is difficult to achieve with a high degree of precision.

SUMMARY

The phenomena of Rabi flopping can be harnessed to dissociate the effect of the different spin population orientations in the detected signal, by attenuating the spin populations transfers of the different spin populations in a different, and known manner. We saw above that spin state transfer can be induced on one or more previously initialized spin population by applying energy at an energy value (e.g. frequency in the case of massless particles such as photons) corresponding to the difference of energy between the two states. However, if the spin state transferring energy, of the right energy value, is applied in the form of a pulse of a given duration, the given duration can potentially generate a phenomena referred to as Rabi flopping which, if fully produced, can entirely cancel the otherwise spin state transferring influence of that energy value. Since the Rabi flopping effect attenuates the population transfer influence, we will refer to it as Rabi attenuation in the context of this specification, independently of the extent (or amplitude) of the attenuation. Some relatively short (within a range of duration that can produce Rabi flopping, or otherwise said within a Rabi range) pulse durations will lead to a fuller effect of the population transfer influence. The smallest, exact duration of the pulse required to reach a fullest population transfer influence is referred to as a Tr-pulse duration and will depend on a quantity referred to as the Rabi frequency. Odd multiples of the π-pulse duration can also lead to very complete population transfer influence. However, even multiples of the π-pulse duration, such as a 2π-pulse or 4π-pulse duration for instance, can entirely cancel or negate the population transfer influence, or otherwise said produce the fullest Rabi flopping effect, and lead to a situation where, even if the energy value applied corresponds to the spin population transfer energy value, the selected duration of the pulse maximally attenuates that influence, which impedes spin population transfer. These even multiples of the π-pulse duration can be said to produce the fullest Rabi attenuation. Durations intermediate to even and odd multiples of the π-pulse will lead to somewhat proportional partial negating influence, and the proportionality is in accordance with a sinusoidal shape and can be precisely known. Interestingly, the Rabi frequency itself, and in turn the corresponding π-pulse duration, can be made to depend on the population's orientation. Indeed, if applied in a manner to produce different trigonometrical projections of the excitation on each one of the defect orientations, the different orientations can experience different proportions of Rabi attenuation due to the different Rabi frequencies. Accordingly, the Rabi frequency can depend on the projection of a microwave orientation on the defect orientation, and the Rabi frequency can be highest when the microwaves are perpendicular to the defect orientations.

Accordingly, one can essentially engineer a system with different Rabi frequencies for the different population orientations by proactively selecting the excitation orientation relative to the population orientations. Then, one can choose to apply a sequence of microwave pulses of different sets of parameters (e.g. different durations and/or different amplitude), the varying parameter(s) being selected in a manner to create a discernible contrast between the amount of Rabi attenuation of a respective one of the population orientations. In one embodiment, the Rabi attenuation can be engineered to be entirely absent for one orientation, and as complete as possible for the other orientations, so as to best isolate the contribution of a single orientation (or otherwise said, maximize "contrast"), for instance.

To illustrate this concept, let us begin by taking a relatively simple scenario where it is known, a priori, that two, and only two, known population orientations have a population transfer occurring at a given energy value, i.e. they have overlapping peaks. At that excitation energy value, the detected signal amplitude represents the sum of the amplitude of both individual population orientation amplitudes, and it is desired to dissociate the individual amplitudes of the population orientations on the detected signal. Essentially, we could measure peaks such as shown in FIG. 2A or FIG. 2B, for instance, by scanning across energy values.

The detected peak, and when looking at it more closely, the measured amplitude at any energy value, is the result of certain variables, including: the central wavelength/frequency of each one of the two peaks which are superposed, the shape and amplitude that the peaks have individually, and the respective attenuation of the peaks. It turns out that if the respective attenuation of the peaks is known given the known relative orientation between the spin populations and the transfer energy emission, and that the shape and amplitude of the individual peaks are known from prior calibration or experiment, the only unknown variables are the central wavelength of each peak. Two unknown variables may not be solvable from a single measurement, but if two measurements are taken, at different pulse durations, one can build a system of two equations with the two unknown variables, and solve the system of equations to yield the variables.

FIGS. 2A and 2B provide a visual representation where, in FIG. 2A, the pulse duration is known to maximize the spin population transfer of spin population a (ie. 100% spin population transfer), while generating 50% Rabi attenuation of the spin population transfer of spin population b. In FIG. 2B, the experiment is repeated but at a pulse duration which is known to maximise the spin population transfer of spin population b (ie. 100% spin population transfer), while generating 25% Rabi attenuation of the spin population transfer of spin population b. With everything other than the central frequencies of spin populations a and b, the resulting system of two equations and two unknowns can allow to solve for the two central frequencies.

The same reasoning can be extended to a scenario where three, four, or potentially more variables are unknown a priori. For instance, in a vectorial magnetometer, the amplitudes of the unknown magnetic field in at least three different orientations are required to reconstruct the 3D vector. The corresponding system of three equations and three unknowns can be built by taking three measurements, each at a different pulse duration known to produce different and known attenuations on the different orientations. Similarly, the central frequencies can be affected by changes in temperature, and if the change in temperature is a priori unknown, it can be preferred to build a system of four equations where the change in temperature is the fourth unknown variable, and then solve for the four unknowns.

In practice, scanning across the frequency spectrum to determine the shape and amplitude of the resulting peak may not be required to reconstruct a 3D vector. Indeed, the measurements at any frequency will bear the sum of any dips associated with that frequency. However, to be relevant, the measurements may need to be made at a frequency corresponding to a peak, and one may need to make at least one measurement indicative of a dip caused by each ones of the peaks of interest. Accordingly, as few as 3 measurements may be used to reconstruct a 3D vector, and as few as 4 measurements if reconstructing a 3D vector while factoring out temperature changes. If it turns out that one of the measurements does not detect any dip, it may be that that measurement needs to be shifted on the energy value scale. In some embodiments, a calibration routine can be performed to establish the different energy values at which the different measurements will be made. In one example, the calibration can be made based on the Earth magnetic field and can provide a first "guess" as to which energy values should be used for the first measurement. As the strength of the external influence increases, the peaks can begin to shift from the initial estimation based on the Earth magnetic field, the system can detect a corresponding increase or decrease of amplitude at the energy values, and automatically shift the energy values to compensate and ensure that each measurement remains relevant. In alternate embodiments, rather than attempting to minimize the number of measurements required to reconstruct a 3D vector, one may prefer to scan across the energy values, or use another measurement strategy.

Accordingly, in accordance with one aspect, there is provided: a vectorial magnetometer comprising: a structure having at least three spin populations, each spin population having a characteristic orientation in the structure and being transferable from a first spin state to at least a second spin state by a transfer energy value which varies as a function of the trigonometrical projection of an ambient magnetic field on the characteristic orientation; a detector configured to measure the amplitude of the spin state transfers; an energy emitter configured to emit electromagnetic waves at tunable energy values adapted to stimulate the spin state transfers in the different population orientations, in pulses of tunable durations, wherein a given duration produces Rabi attenuation of the stimulated transfer in different, known proportions for the different characteristic orientations; and a controller configured to, for each one of at least three of the characteristic orientations, perform at least one measurement including activating the energy emitter at a corresponding duration and measuring an amplitude of the corresponding spin population transfer with the detector, and determine the transfer energy value of the corresponding orientation based on the one or more measured amplitude; wherein said determining includes dissociating the amplitude associated specifically to one of at least two of the characteristic orientations based on the known proportions of the Rabi attenuation in the different characteristic orientations when the transfer energy values of the at least two characteristic orientations coincide.

In accordance with another aspect, there is a computer-implemented method of measuring the amplitude of a spin state transfer in a structure having spin populations having characteristic orientations in the structure and being transferable from a first spin state to a second spin state by energy at a transfer value, wherein the transfer value changes as a function of a trigonometrical projection an external influence on the corresponding orientations, the method comprising: emitting electromagnetic waves of a given frequency in a pulse of a given duration and in a given orientation onto the spin populations in the structure, the given frequency having an energy value corresponding to a difference between energy levels of first spin state and the second spin state for at least two of the spin population orientations, and thereby adapted to stimulate the transfer in said at least two spin populations; the given duration adapted to fully or partially attenuate the transfer stimulation effect of the given frequency in at least one of said at least two spin populations due to Rabi flopping, wherein an amplitude of the attenuation is different for the different ones of the at least two spin populations depending on the relative orientation between the electromagnetic waves and the at least two spin populations; detecting a total amplitude of the population transfer from the first spin state to the second spin state in said at least two spin populations due to said emitting; and determining an amplitude of population transfer from the first spin state to the second spin state specific to one of the at least two spin population based on the detected total amplitude and the relative orientation between the electromagnetic waves and the at least two spin populations.

In accordance with still another aspect, there is provided a method of determining the amplitude of a spin state transfer in a structure having spin populations having characteristic orientations in the structure and being transferable from a first spin state to a second spin state by energy at a transfer value, wherein the transfer value changes as a function of a trigonometrical projection of an external influence on the corresponding orientations, the method being implemented by a computer having at least one processor and a non-transitory memory system accessible by the processor, the non-transitory memory having stored therein data corresponding to different total amplitudes of the population transfer from the first spin state to the second spin state in said at least two spin populations due to: emitting electromagnetic waves of a given frequency in a pulse of a given duration and in a given orientation onto the spin populations in the structure, the given frequency having an energy value corresponding to a difference between energy levels of first spin state and the second spin state for at least two of the spin population orientations, and thereby adapted to stimulate the transfer in said at least two spin populations; the given duration adapted to fully or partially attenuate the transfer stimulation effect of the given frequency in at least one of said at least two spin populations due to Rabi flopping, wherein an amplitude of the attenuation is different for the different ones of the at least two spin populations depending on the relative orientation between the electromagnetic waves and the at least two spin populations; detecting a total amplitude of the population transfer from the first spin state to the second spin state in said at least two spin populations due to said emitting; and repeating the emitting to perform a sequence of measurements with pulses of different durations, yielding the different detected total amplitudes in the data; the non-transitory memory system further comprising, stored thereon, computer readable instructions which, when executed by the processor, causes the computer to determine an amplitude of population transfer from the first spin state to the second spin state specific to one of the at least two spin populations based on the detected total amplitude and the relative orientation between the electromagnetic waves and the at least two spin populations and on the variation in the detected total amplitudes from one pulse duration to another.

It will be understood that in this specification, the expression "computer" is not to be interpreted in a limiting manner. It is rather used in a broad sense to generally refer, as schematized in FIG. 17, to the combination of some form of one or more processing units, some form of memory system accessible by the processing unit(s), and some form of input/output interface. The memory system can be of the non-transitory type. The use of the expression "computer" in its singular form as used herein includes within its scope the combination of a two or more computers working collaboratively to perform a given function. Moreover, the expression "computer" as used herein includes within its scope the use of partial capabilities of a given processing unit.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), to name a few examples.

The memory system can include a suitable combination of any suitable type of computer-readable memory located either internally, externally, and accessible by the processor in a wired or wireless manner, either directly or over a network such as the Internet.

A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer can have one or more input/output (I/O) interface to allow communication with a human user and/or with another computer via an associated input, output, or input/output device such as a keyboard, a mouse, a touchscreen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions.

Many further features and combinations thereof concerning the present improvements will appear to those skilled in the art following a reading of the instant disclosure.

DESCRIPTION OF THE FIGURES

In the figures,

FIGS. 2A and 2B are schematic graphs showing superposed amplitudes;

FIG. 3 is a graph showing an energy dip centered around a peak transfer energy value;

FIG. 4 is a graph showing a plurality of partially superposed energy dips corresponding to the Earth's magnetic field as measured with ODMR on NV centers;

DETAILED DESCRIPTION

An example context in which the method can be performed will now be detailed. This example uses the optically detected magnetic resonance (ODMR) technique on a diamond substrate 12 having Nitrogen-vacancy (NV) defects 10, as this was found to be a suitable approach at least in some embodiments or applications. Before delving into the example below, it will be stressed that alternate embodiments may use other types of structures having spin populations in more than one characteristic orientation and transferable between spin states at a transfer energy value which varies as a function of the trigonometrical projection of an external influence on the characteristic orientation. Moreover, alternate embodiments may use other detection techniques than ODMR.

Concerning the example which will now be detailed, it will be noted that magnetic fields can be measured using optically detected magnetic resonance (ODMR) on crystalline substrates having defects in which the spin state of electrons is sensitive to the magnetic field. Nitrogen-vacancy (NV) defects 10 in a diamond substrate 12 constitute an example of such a crystalline substrate.

Figures 1A, 1B:
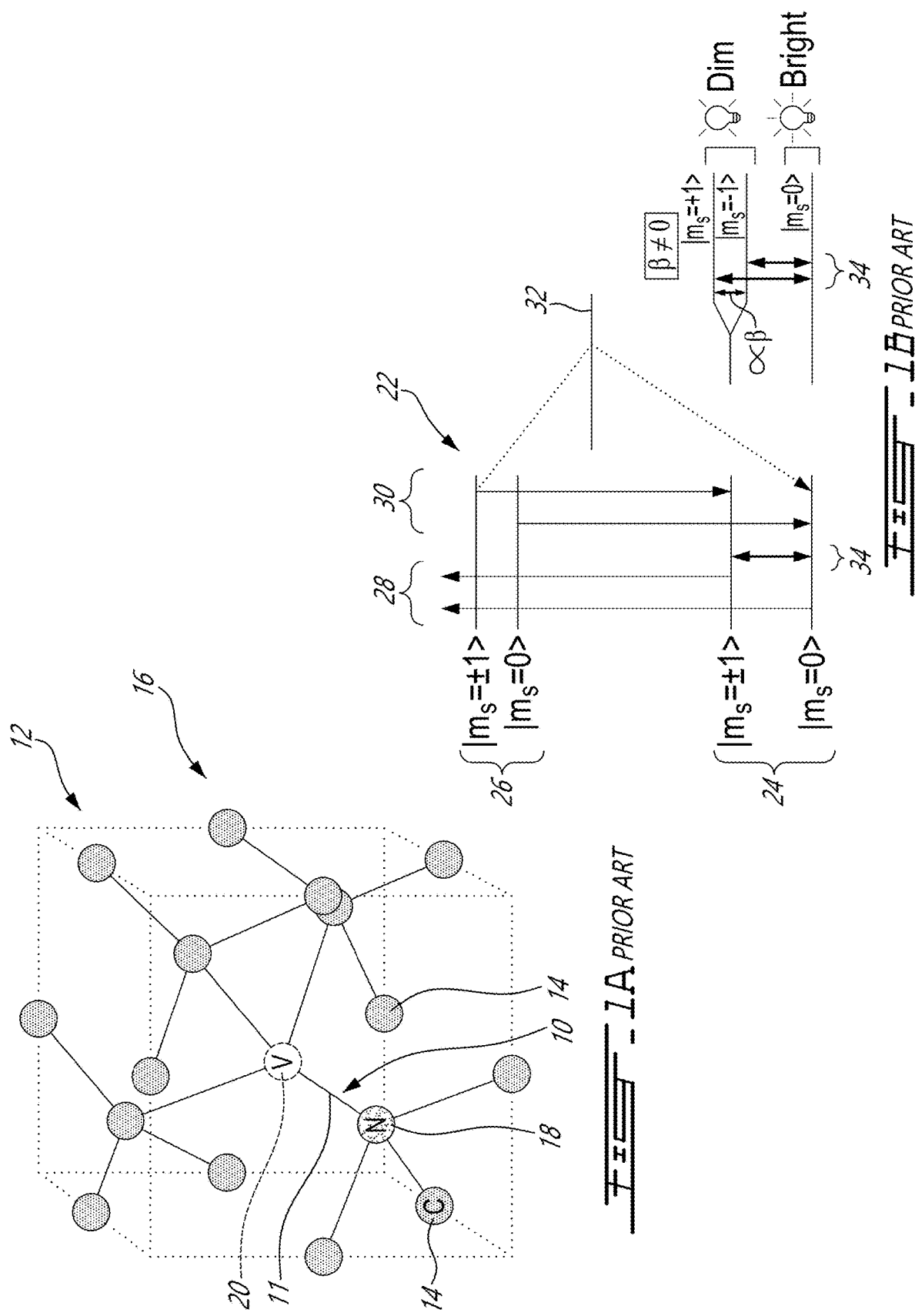
FIG. 1A is a schematic view showing an NV center in a diamond substrate.
FIG. 1B is a diagram showing energy levels for NV centers.

NV defects 10 are, in fact, an interesting example and will be used for the sake of illustrating a possible embodiment. An example of an NV defect 10 in a diamond substrate 12 is shown in FIG. 1A. It consists of two of the carbon atoms 14 of the crystalline matrix 16 which are substituted by a nitrogen atom 18 and an adjacent vacancy 20, respectively. The NV defect 10 can be oriented in any one of four specific orientations associated with the crystalline matrix 16. Two free electrons in close proximity to the NV defect 10 form a triplet spin state. One of the possible motivations of using the NV defect 10 in diamond is that such substrates 12 can be provided in a relatively inexpensive manner with a given, approximately known, concentration of NV defects 10 of the different orientations distributed randomly in the crystalline matrix 16. The substrate 12 will typically have a sufficiently high amount of NV defects 10 to be treated in a statistical manner, with the amount of NV defects 10 of each orientation being approximately equal.

FIG. 1B shows an energy diagram 22 of this triplet spin state. More specifically, the base state 24 can have any one of three states $m_s=0$, $m_s=1$ and $m_s=-1$. Via the Zeeman effect, the energy levels between the states $m_s=1$ and $m_s=-1$ is separated by a difference of energy which is related to the projection of the magnetic field β along the NV defect axis 11. The energy values can be identified in any suitable unit. ElectronVolts (eV) can be used for instance. However, as values of energy, such as the difference of energy between two states for instance, can correspond to a photon of a given wavelength/frequency, values of energy can alternately and equivalently be referred to by a photon frequency or a photon wavelength, for instance.

The triplet spin state also has an excited state 26. At rest, the NV defects 10 will be in the base state 24, or ground state, and the population will be distributed between the states $m_s=0$, $m_s=1$, and $m_s=-1$. A typical ODMR experiment can interrogate the spin states in a diamond substrate 12 having NV defects 10 beginning by an initialization step, in which the triplets resting in the base state 24 are excited to the excited energy state 26. This can be done using green laser light 28 for instance, or resonant red laser light (not shown) as known in the art. Based on the rule of conservation of angular momentum, the $m_s=0$ state can be excited to the $m_s=0$ excited state, the $m_s=1$ base state can be excited to the $m_s=1$ excited state, the $m_s=-1$ state can be excited to the $m_s=-1$ excited state. The excited $m_s=0$ state 26 will relax (aka: quench) into the base $m_s=0$ state 24, by emitting a photon in the red portion of the optical spectrum and can therefore be said to be "fluorescent". The excited $m_s=1$ and $m_s=-1$ states may also be quenched back to the $m_s=0$ state, though via a singlet interstate 32 coupling and can be said to be "low fluorescence". Since all excited states 26 can relax into the $m_s=0$ base state 24, this process can be said to "initialize" the spin states to the $m_s=0$ state. In practice, not "all" of the $|+/-1>$ excited state population decays back to the $|0>$ ground state, but after a few cycles, the vast majority will be initialized in $|0>$, probabilistically speaking. In the context of NV defects 10, the process of initialization is quick, and once the states have been converted to the $m_s=0$ base state 24, the relaxation time ($T_1$) for the $m_s=0$ base state to "re-scramble" into the rest distribution of S=0, S=1 and S=-1 states is longer, taking the order of a millisecond.

For the sake of clarity in later reference in this text, the emission of photons used to excite the triplet from the base state 24 to the excited state 26 will be referred to herein as the "transition energy" to refer to the emitted energy which causes the transition from the base state 24 to the excited state 26. In NV defects 10, the transition energy can be provided by photons in different wavelengths or, perhaps, phonons if a sufficient energy level of phonons can be harnessed in a specific application.

However, by acting quicker than the relaxation time ($T_1$), the base $m_s=0$ ($|0>$) state can also be proactively transferred into the $m_s=1$ or $m_s=-1$ ($|+/-1>$) base states by applying energy of an energy value which corresponds to the energy difference between the $m_s=0$ energy level and the corresponding one of the $m_s=1$ or $m_s=-1$ energy level. The exact amount of energy to transfer $m_s=0$ to $m_s=1$ or $m_s=-1$ can be referred to as the "resonating" energy value. It will depend on the projection of the amplitude of the magnetic field along the corresponding defect axis, and accordingly, a measurement indicative of the magnetic field can be made by probing the defects to determine the resonating energy value, which can be measured in the form of a "resonant frequency".

Figure 5:
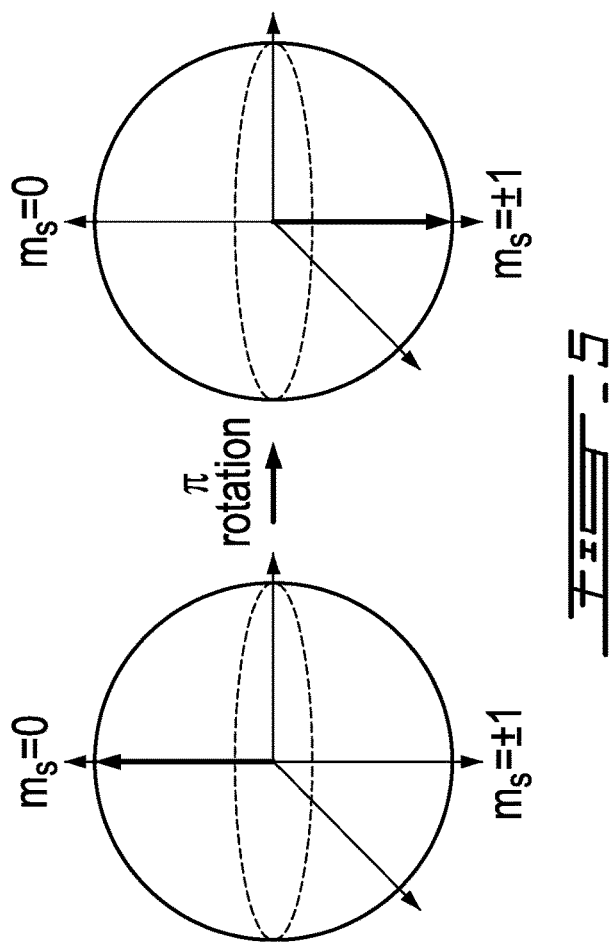
FIG. 5 is a schematic view of Bloch spheres schematizing the rotation from the $m_s=0$ to $m_s=+1$ state by a half rotation around the Bloch sphere.

This emission of an energy value adapted to transfer the spin state of the defect can be referred to herein as the "spin-state-transferring energy", or simply "transfer energy value" 34 by contradistinction to the "transition" energy, and essentially targets the base $m_s=|0>$ to the $m_s=|+/-1>$ transitions, schematized in FIG. 5, rather than exciting the ground triplet to the excited triplet states (see "green laser" 28 in FIG. 1B).

In the case of NV defects 10, the transfer energy value 34 corresponds to photons in the microwave portion of the electromagnetic spectrum and a corresponding microwave field can be applied using a waveguide in the form of a wire, for instance, and of which the frequency can easily be tuned. The orientation of the wire can also be specifically determined relative to the crystalline substrate, and can thus be constant and know (e.g. via calibration) relative to the NV defect 10 orientations.

The stimulated transfer to $m_s=|+/-1>$ can be interrogated, for instance, by repeating the step of transitioning the base triplet states 24 to the excited triplet states 26, and measuring the amount of radiation emitted by the excited states 26 transitioning back to the base states 24. Indeed, since the transition energy will transition the base states 24 into their respective excited states 26, and since the $m_s=|+/-1>$ excited states are low-fluorescence, the measured intensity of the radiation will be stronger when the transfer from $m_s=|0>$ to the $m_s=|+/-1>$ has failed, than when the transfer has succeeded. This "interrogation" also has the effect of "initializing" the system back to the $m_s=0$ base state, which is perfect for making another transfer attempt, and this process can be repeated at different frequencies, and the measured amplitude plotted in a chart, producing dips, referred to herein as "peaks" along the graph, at energy values/frequencies at which the transfer has succeeded.

Figure 6:
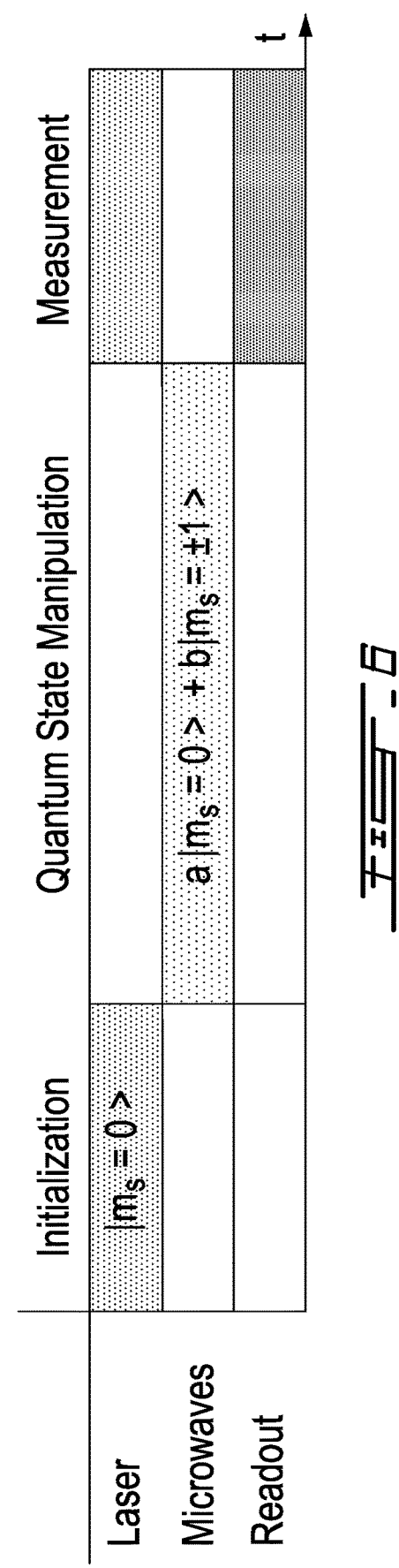
FIG. 6 is a schematic view of an example ODMR technique.

The entire process for making one measurement, from the initializing transition to the interrogation transition, including the intervening spin-state transfer, can thus be as schematized in FIG. 6. If repeated successively at progressively increasing or decreasing frequencies (e.g. by scanning the frequency spectrum), and in the absence of an external magnetic field, one can form a graph 36 such as presented in FIG. 3 showing a measured signal vs. frequency in the absence of a magnetic field. The detected radiation intensity dips as the energy reaches the nominal field splitting frequency $f_0$, or transfer value.

In practical applications, the entire process, including the spin-state-transfer and the interrogation, must be performed more quickly than the relaxation time, otherwise the relaxation will cause noise in the form of $m_s=|+/-1>$ states induced by relaxation rather than spin state transfer, which can ultimately overwhelm the effect of the proactively induced spin-state-transfer. In practice, the entire process for making one measurement can be performed in less than 10 micro-seconds, and perhaps even in the 1 micro-second range which can be preferred for quantum reasons. This can be entirely suitable in the case of NV defects 10 where the relaxation time $T_1$ can be in the order of a few milliseconds at room temperature. In a measurement protocol implementation, it can be desired to proceed faster than the quantum phase decoherence time, or dephasing time $T_2^*$, which is in the order of a few microseconds.

Applying the energy using a microwave pulse which is not simultaneous to the initialization can be preferred and can make the line on the graph of FIG. 3 sharper by avoiding phenomena of power broadening encountered when applying microwaves during the optical measurement. Accordingly, using a process such as described above, can allow to make a graph 36 such as presented in FIG. 3, and to measure an absolute value of $f_0$ essentially by finding frequency of the minima of the curve (aka center of the peak), for instance. This can be automated using a computer.

Temperature fluctuations can affect the absolute value of $f_0$, and can essentially shift (offset) the curve to the right or to the left. If it is desired to measure the variations in temperature, for instance, it will be understood that knowing the relationship between the absolute temperature and the absolute value of $f_0$ (which can in the form of a table, graph, or calibration data for instance), one can proceed to measure the absolute value of $f_0$, and then associate the measured value of $f_0$ to the corresponding absolute value of temperature T. However, the process of plotting the entire curve to determine an absolute frequency value such as $f_0$ is relatively complex and time consuming. In many cases, rather than tracking the absolute frequency value, it can be preferred to simply track changes in the frequency value, which can be done in a simpler manner.

For example, in a context where the temperature only shifts the dip in the curve to the right or to the left, and does not, for instance change the amplitude of the curve (e.g. such as schematized in the displacement from the continuous line 38 to the dashed-dot line 40 in FIG. 3), the measurement can be taken at a single frequency (schematized by the vertical dashed line 42 in FIG. 3), and if certain assumptions can be made, such as that the two measurements 44 of intensity are taken on the same side of the dip 46 and the shape of the dip is constant and known, one can essentially plot a given intensity measurement to a given position of the dip along the horizontal axis, and essentially determine $f_0$ from the established position of the dip along the horizontal axis. Such as technique can allow to determine a relative difference in temperature $\Delta T$ simply based on a relative difference in intensity $\Delta PL$, essentially using 2 measurements as opposed to a fuller scan. It will be understood that the degree of precision achievable by such a relative measurement can be higher when the movement of the measured intensity occurs along a portion of the dip curve where the slope is higher, and so for fine measurements, regions of higher slope can be preferred over regions of lower slope. Moreover, even in a situation where the shape the dip curve changes or where the amplitude of the dip curve fluctuates upon a change in temperature, as long as the change in the curve is predictable and repeatable, calibration can allow to factor out such variations, and still achieve a relative measurement using only two measurements. The same approach of using detected changes in amplitude along known curve shapes can be used for measurements other than temperature, such as magnetic field amplitude for instance, and we will come back to this optional technique of making relative measurements rather than absolute measurements further below.

More specifically, in the case of NV defects 10 (aka NV centers), in the absence of an external magnetic field, the nominal ("zero-field") splitting is of $f_{NV0}$~2.87 GHz between the $m_s$=|0> and the $m_s$=|+/−1> states.

Figure 7:
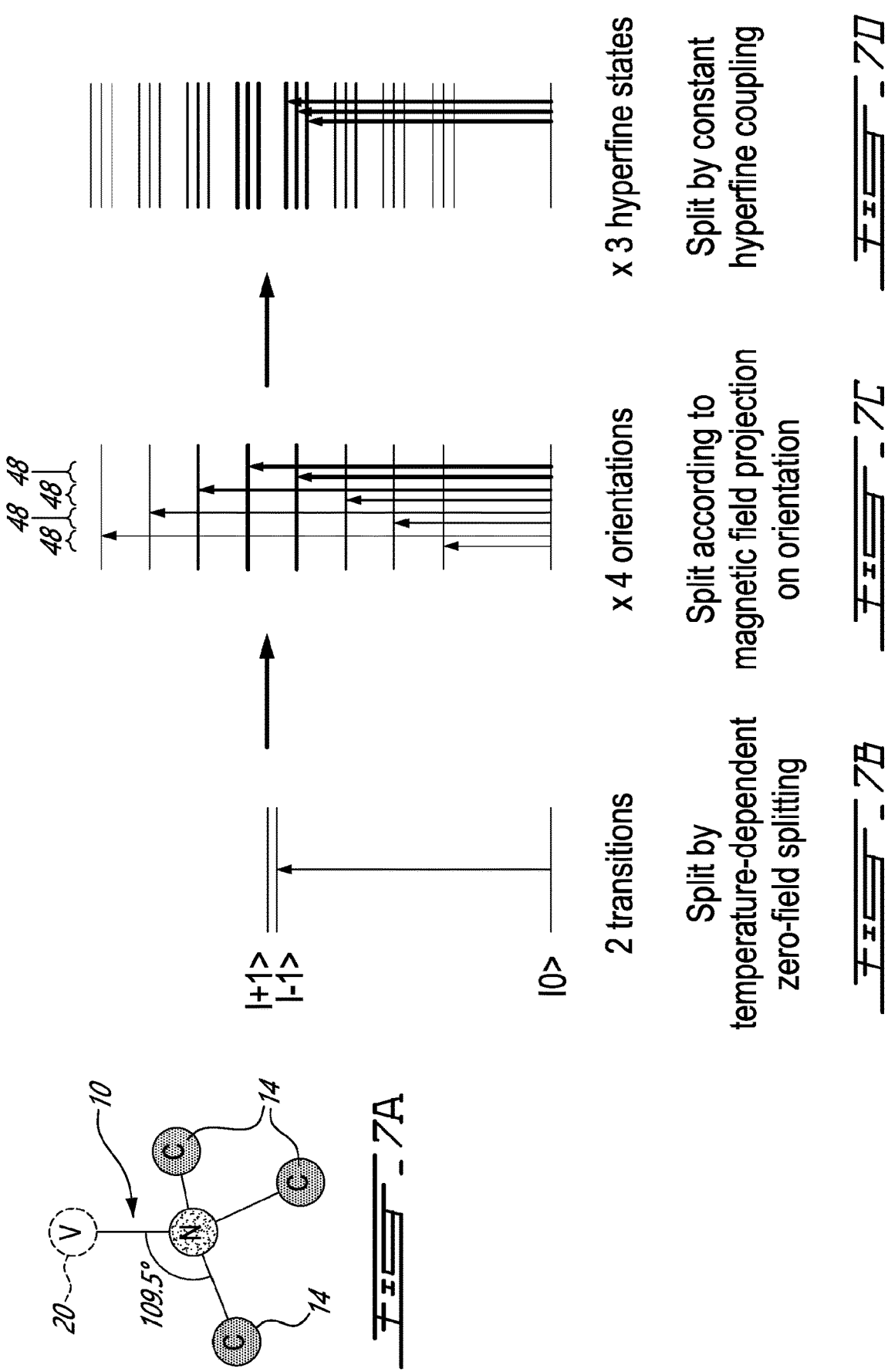
FIG. 7A is another schematic view of a NV center.
FIGS. 7B to 7D are diagrams showing the splitting of energy levels due to various effects.

A ambient magnetic field $\beta$ will split the resonances, as shown in FIG. 7B, forming two measurable "dips" for each NV defect 10 orientation instead of a single dip and temperature variations will shift the entire curve to the right or to the left. Under a weak magnetic field, the equation describing the phenomena is expressed by:

$$f_{res-}=f_{NV0}+c_T\Delta T \pm \gamma \beta_{proj}$$

Where $\beta_{proj}$ is the projection of the magnetic field axis on the axis of the NV defect 10 and the plus or minus sign depends on the transition (minus for |0> to |−1>, plus for |0> to |+1>).

The NV defects 10 can assume four different orientations in the diamond crystal, one of them being shown in FIG. 7A, while the other possible NV defect 10 orientation can be formed by switching any one of the carbon atoms (C) 14 with the vacancy (V) 20 in the structure of FIG. 7A, leading to four pairs of resonance lines each split by the projection of the magnetic field on the given orientation (see FIG. 7C). Given knowledge of the temperature fluctuations $\Delta T$, measuring three of these projections can be sufficient to reconstruct the magnetic field vector as the orientations are linearly independent. If the temperature fluctuations are unknown, one can still reconstruct the magnetic field vector together with the temperature, by using four of these projections, essentially by forming an equation system with four equations and four variables.

At this point, we have two transitions per orientation times four orientations 48 for a total of eight magnetic resonances; however, we have an additional splitting of each one of those resonances into three due to hyperfine splitting. This splitting leads to a total of 24 resonances, as illustrated in the level structure of FIG. 7D. Nonetheless, as this hyperfine splitting is constant, and the + and − splits are symmetrical relative to $f_{NV0}$~2.87 GHZ, we only have four independent variables in the problem: $\Delta T, B_x, B_y, B_z$ such that measuring the frequency of four resonance lines (from at least three different orientations) can be sufficient.

In order to perform vectorial measurements with NV defects 10, it is necessary to have a method that permits isolating the effect on the fluorescence measurements from at least three defect orientations. In a usual context where the magnetic fields are on the scale of the field of the Earth (~50 µT), the full magnetic resonance spectrum of the NV defect 10 has 24 overlapping spectral lines (caused by 4 NV orientations with 3 peaks per orientation), which, when scanned using a technique such as presented above, can yield a graph 52 such as shown in FIG. 4.

In a magnetometry context, there can be a challenge in identifying the different orientations of the NV defects 10 so to reconstruct the magnetic field vector, and the magnetic moment can become contingent upon the identification.

Figure 8:
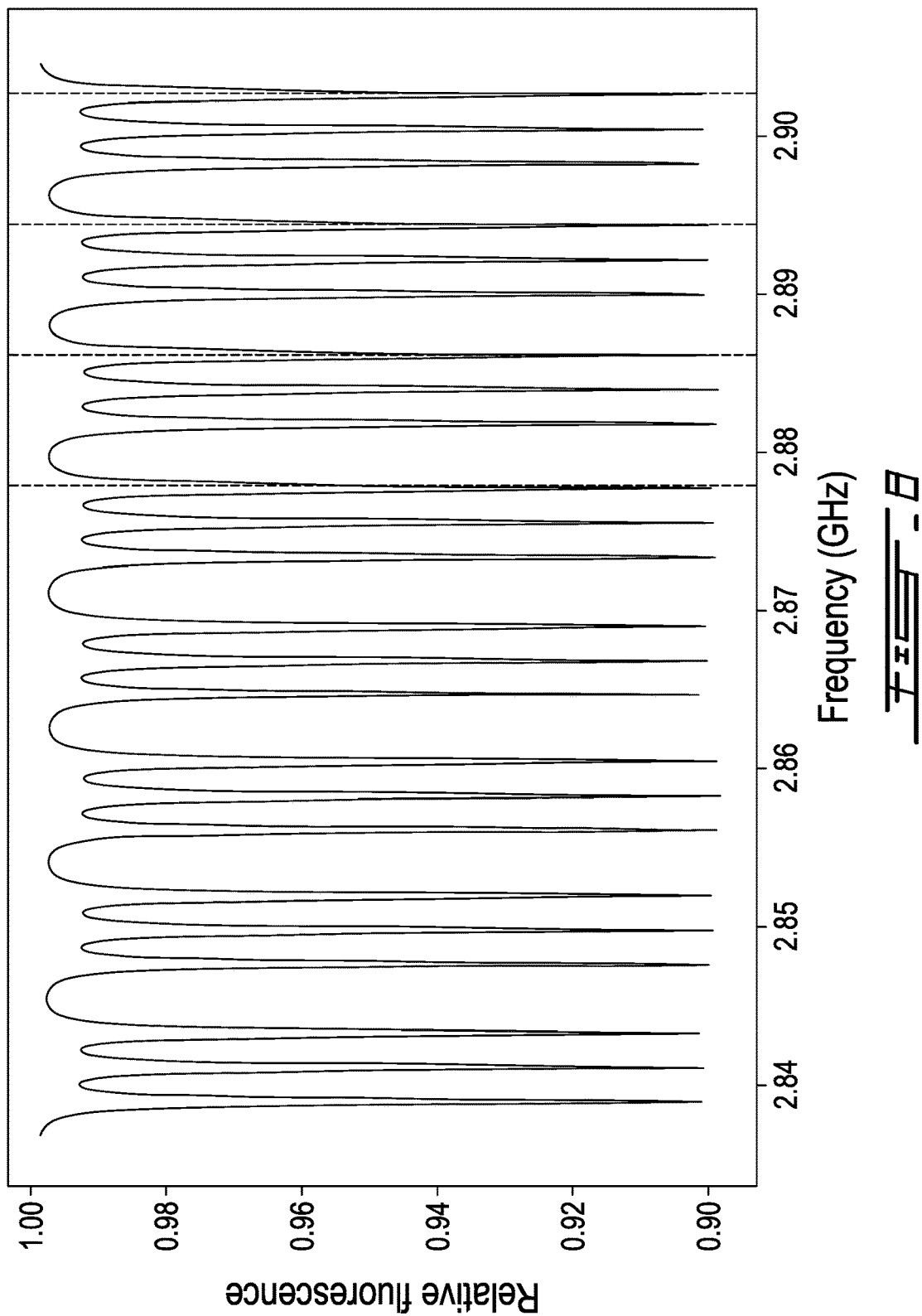
FIG. 8 is a graph similar to FIG. 4, but where the energy dips have been separated by a strong external field.

In one approach, the resonance lines from the four orientations can be split by adding a bias magnetic field from permanent magnets at the sensor position. In that approach, the lines can become clearly split in a predictable fashion so as to identify the orientations, such as presented in the graph 54 of FIG. 8.

However, this method can be unsatisfactory for high-sensitivity (in the order of nT) measurements as the bias field can have stringent requirements in terms of spatial uniformity, temperature sensitivity and mechanical vibration sensitivity. Since the bias field needs to be >1 mT in order to split the lines cleanly, achieving a nanotesla accuracy requires its knowledge to be one part to one million.

Another approach can be preferable at least in some embodiments.

In one example, such another approach is based on using an engineered difference in the Rabi frequencies of the various orientations upon application of the microwave drive. This method may allow to achieve nT accuracy given a <3% precision on the knowledge of Rabi frequencies. As this eschews bias magnets, the method can be referred to as Zero Bias Field magnetometry.

Indeed, variations in the pulsed microwave duration can further be used to cause spin inversion, known as Rabi flopping, which can, for specific pulse durations, cause the $m_s$=1 or $m_s$=−1 state to flop to $m_s$=0, and thus attenuate or cancel the otherwise transfer-stimulating action of the microwave frequency. If the Rabi flopping is complete, it can cause the dips to disappear. More specifically, specific ($2\pi$ and other even multiples $\pi$) pulse durations can produce complete Rabi flopping whereas intermediate ($\pi$ and other odd multiples thereof) pulse durations will not. Interestingly, as we will see in further below, odd multiples of the $\pi$-pulse duration can cause similar effects as the $\pi$-pulse duration, essentially causing more than one rotation around the Bloch sphere. The parameters of the pulses can thus be controlled to harness the phenomenon of Rabi flopping.

Figure 9:
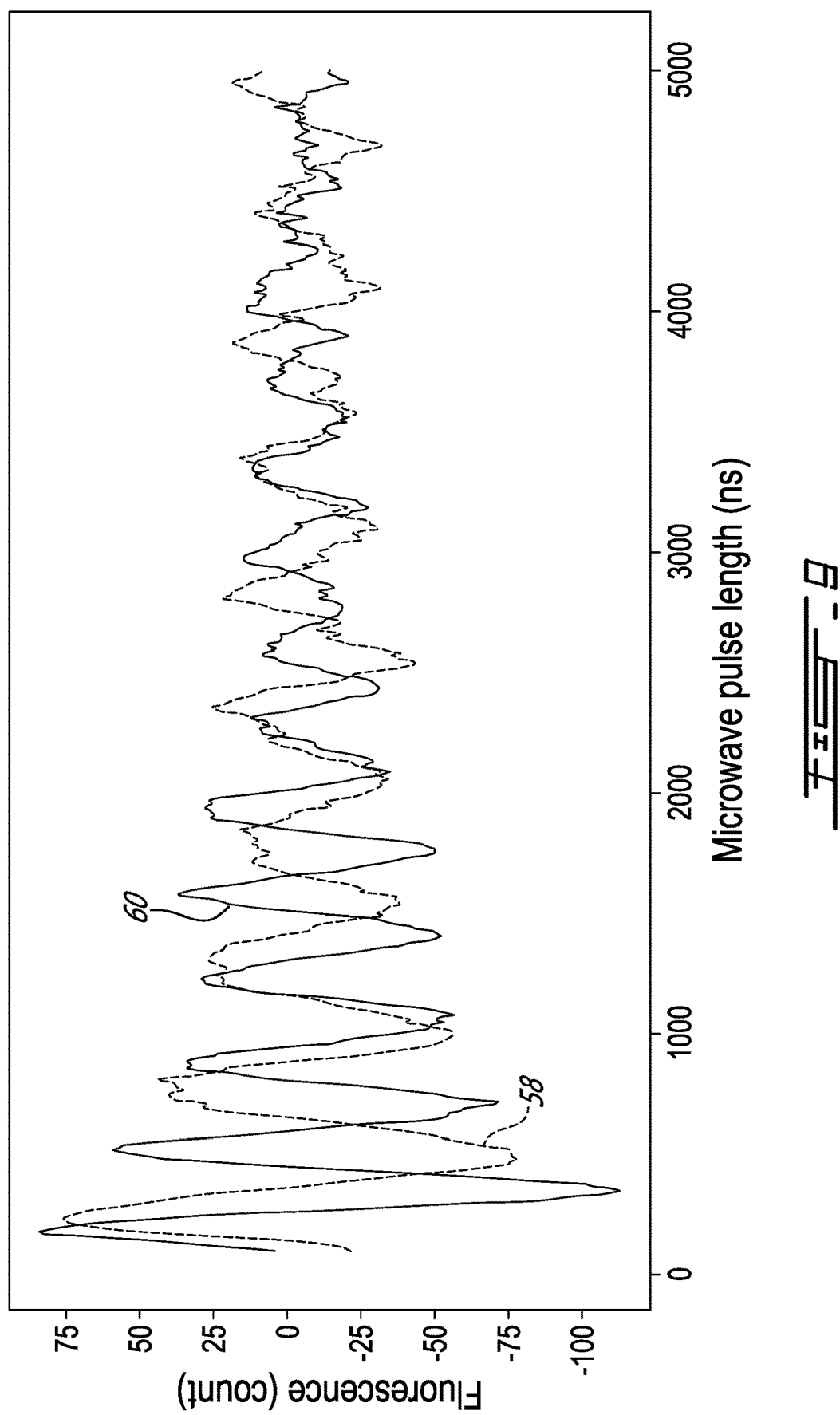
FIG. 9 is a graph showing detected ODMR amplitude at an energy transfer value for varying pulse parameters.

More specifically, FIG. 9 presents two examples. In a first series of pulses 60, the amplitude of the pulses is maintained constant from one pulse to another, while the duration of the pulses is varied as described above. The resulting plot of detected fluorescence intensity vs. pulse duration shows a periodic oscillation with a frequency corresponding to the Rabi frequency. In the first series of pulses 60, the individual pulses in the series have a corresponding set of pulse parameters including pulse duration and pulse amplitude, and the sets of pulse parameters are varied from one pulse to the next by maintaining the pulse amplitude constant and by varying the pulse duration. The result is characteristic given its fluorescence count which oscillates in a progressively attenuating amplitude as a function of pulse duration. Indeed, a such a first series of pulses 60 can be produced by locking the frequency of the microwave to a spin state transfer energy value of a given one of the dips, and scanning the pulse duration of the microwaves, such as by progressively increasing the duration for instance, while keeping other factors constant and plotting the detected intensity. The first series of pulses 60 has a first pi-pulse duration.

FIG. 9 also presents a second series of pulses 58. In the second series of pulses 58, the pulse amplitude is also maintained constant from one pulse to another, while the duration is progressively varied to create the curve plotted on the graph. However, the pulse amplitude of the second series of pulses 58 is weaker than the pulse amplitude of the first series of pulses 60, which has the effect of increasing the pi-pulse duration compared to the first pi-pulse duration. Indeed, the period of the population transfer oscillation will be longer if the microwave signal is weaker.

It will be understood in FIG. 9 that different pulses generated by the energy emitter can intentionally be emitted with different parameters in order to intentionally generate a known amount of Rabi flopping which can be determined by calibration or calculation for instance. In this manner, individual pulses can have corresponding sets of pulse parameters where each set includes a pulse duration and a pulse amplitude. The sets of pulse parameters can be changed from one of the pulses to the next by changing either one of, or both of, pulse duration and pulse amplitude, to generate the known amount of Rabi flopping which is then detected and used to better interpret the signal. In the examples presented in FIG. 9, the pulse amplitude is maintained constant while the pulse duration is varied, to generate varying sets of pulse parameters where duration varies from one pulse to the next, but it will be understood that in alternate embodiments, the pulse duration could be maintained constant while varying pulse amplitude to achieve a similar effect, or both pulse duration and pulse amplitude can vary in one of the sets of pulse parameters to the next.

While the effect of the microwave frequency affects all defect orientations uniformly, the effect of pulse duration depends on the trigonometrical projection of the microwave energy on the specific defect orientation. Accordingly, in the case of NV defects 10 in diamond, different $\pi$-pulse durations will be measured at the energy levels of the dips as a function of the projections of the microwave amplitude in the orientations associated to the dips changes. If measured, the different $\pi$-pulse durations can be associated with corresponding, different amplitude projections of the microwave emission in different defect orientations. If the microwave emission orientation is known relative to the orientation of the defects, the different microwave amplitude projections measured can be used to determine the relative orientation of the defects. If the relative angle between the microwave waveguide and the defect orientations is known, the value of the microwave amplitude projections for the different defect orientations can be determined based on trigonometric relationships. In one embodiment, a thin metal wire waveguide can used and positioned on a planar surface of the crystalline substrate, at a given inclination, and the resulting magnetic field orientation can be calculated based on the Biot-Savart relationship. This can be suitable for some applications. In a scenario where the microwaves are produced along a single, strategically oriented waveguide, a determination can be made based on the relative amplitudes in accordance with the different projections, and it may not be required to know the microwave absolute amplitude.

Also, the length of the microwave pulse can be carefully chosen so to have a perfect population transfer—the resulting rotation of IT on the Bloch sphere, shown in FIG. 5, lends the $\pi$-pulse moniker to the microwave perturbation. The rotation induced on the Bloch sphere as a function of the duration t of the pulse is given by:

$$\Delta\theta = \Omega_R t$$

Such that we will have $t = \pi/\Omega_R$ in this case. The Rabi frequency can also change due to the detuning—at the setpoint, without an external magnetic field, we have:

$$\bar{\Omega}_R = \sqrt{\Omega_{R0}^2 + \left(2\pi\frac{\Gamma}{\sqrt{3}}\right)^2} \rightarrow \bar{f}_R = \sqrt{f_{R0}^2 + \left(\frac{\Gamma}{\sqrt{3}}\right)^2}$$

Where $\Omega_{R0}$ is the Rabi frequency without any detuning at all.

The Rabi frequency is in fact dependent on the relative orientation of the NV defect magnetic dipole and the field from the microwave. We achieve a maximal effect when these two vectors are orthogonal; in general, the Rabi frequency is given by:

$$\Omega_{R0} = \sin[\theta_{\vec{m},\vec{v}}]\Omega_{Rmax} = \sqrt{1 - \left(\frac{\vec{m} \cdot \vec{V}}{|m||V|}\right)^2} \Omega_{Rmax}$$

Where $\vec{m}$ is the dipole moment of the transition between the $m_s = 0$ and $m_s = \pm 1$ states of the defect, $\vec{V}$ is the magnetic field induced by the microwave drive (the letter V has been used to prevent confusion with external magnetic fields), and $\Omega_{Rmax}$ is the maximum achievable Rabi frequency when perfectly orthogonal.

Figure 10:
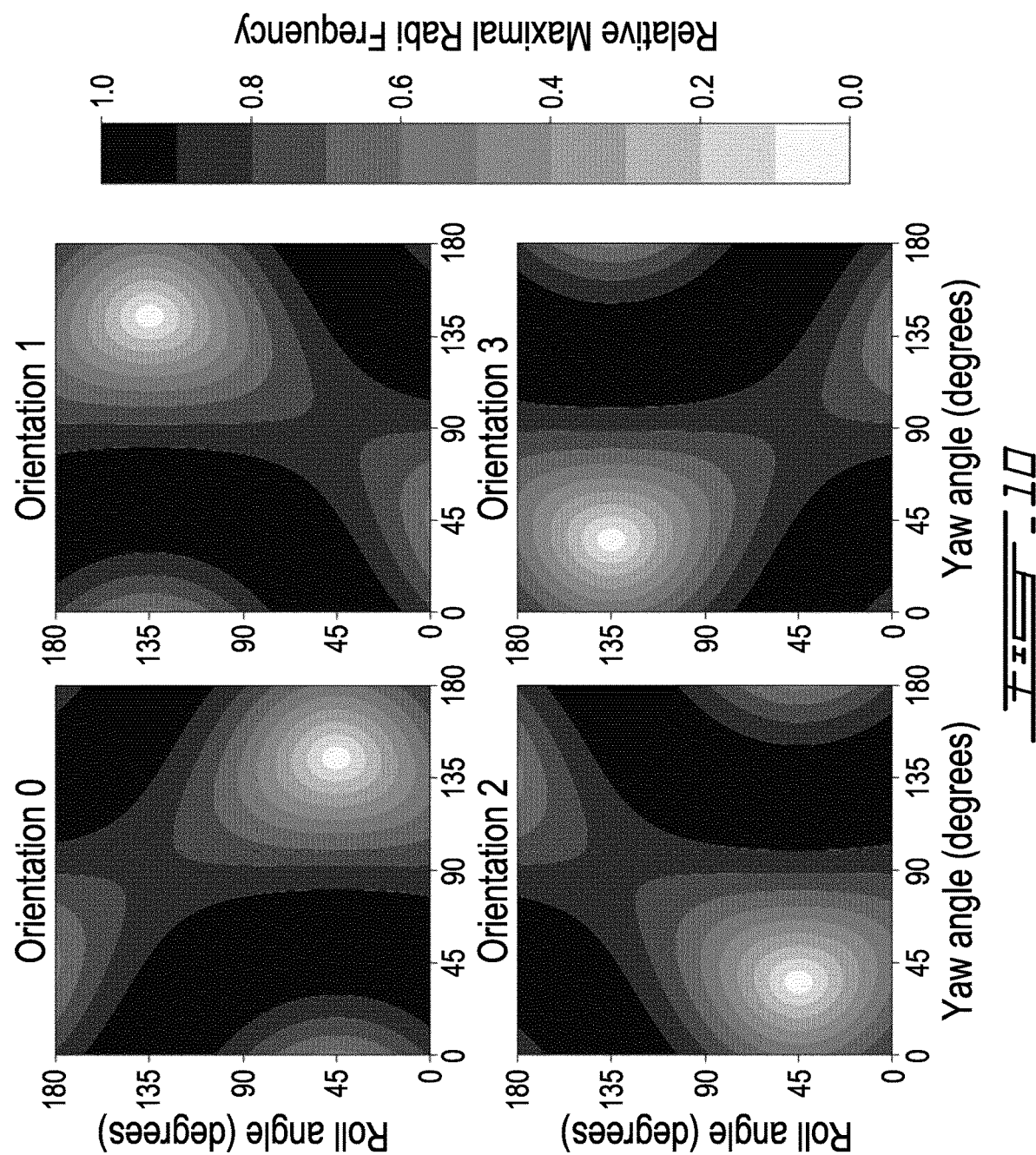
FIG. 10 presents graphs illustrating how the Rabi frequencies along the four orientations can vary as a function of yaw and roll angles for a |100| diamond sample.
Figure 11:
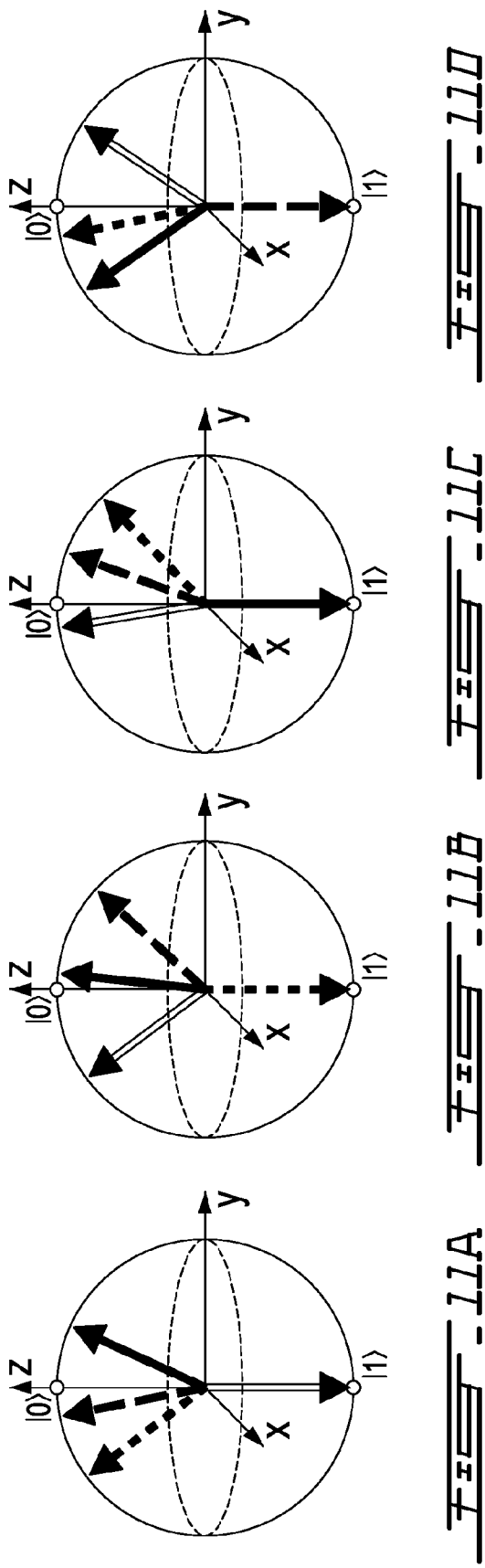
FIGS. 11A to 11D present a sequence example schematic representations of relative rotations around the Bloch sphere for various orientations, for a four-part measurement where each step has a pulse optimized so to fully transfer the population of one orientation while maximizing Rabi attenuation in the other three orientations.

We can as such engineer a situation where the dot product is different for all four defect orientations. If we take $\vec{V}$ to be along the $\hat{y}$ axis, we have two degrees of freedom—the angles of rotation around the $\hat{x}$ axis (roll) and around the $\hat{z}$ axis (yaw). FIG. 10 illustrates how the Rabi frequencies along the four orientations, called orientations 0, 1, 2 and 3 respectively in this example, can vary as a function of these two angles for a |100| diamond sample:

The optimal angles, defined by the biggest minimum spacing between frequencies, are at: (yaw,roll)=(63.0°, 56.79), at which point the relative Rabi frequencies are: $f_{R0}$, $f_{R1}$, $f_{R2}$, $f_{R3} \approx 0.480, 0.808, 0.898, 0.988$. It may be desired to optimize the angles in some embodiments, however, functional embodiments may be reached where the angles are not fully optimized.

Accordingly, a minimum difference of 9% in the Rabi frequencies of the different orientations can be achieved. This is not an ideal situation as such a small difference would not create a large difference in the projection of the quantum state along the low-fluorescence $m_s=\pm 1$ state. The projection on these states is given by the Rabi frequency of the specific orientation and the duration t of the microwave pulse:

$$P_{m_s=\pm 1} = \sin^2[\pi f_{Ri} t]$$

One additional variable which can be tuned is to use a pulse duration which is greater than a single half-rotation on the Bloch sphere. Indeed, while pulsed ODMR scheme can use a π-pulse where the quantum state gets transferred to the $m_s=\pm 1$ state through a single half-rotation on the Bloch sphere, it is conceivable to use any odd multiple of these to bring it to the same spot (3π, 5π, 7π, . . . ). Doing more rotations can amplify the effect of having different Rabi frequencies through accumulation. Given that NV defect magnetometry can be a problem with three variables, i.e. the magnetic field vector $B_x$, $B_y$, $B_z$ and potentially four variable, i.e. the additional temperature shifts ΔT (which also cause a frequency shift), one may wish to address it using a four-part measurement where each step has a pulse optimized so to transfer the population of one orientation to the $m_s=\pm 1$ state, while keeping the other three orientations near the $m_s=0$ state. This is perhaps best seen in FIG. 11A-11D, each one of the figures showing a step of the four-part measurement.

Rather than limiting the rotation on the Bloch sphere to a single half-rotation by an appropriately tuned π-pulse duration as previously shown in FIG. 5, the problem can, if desired, be optimized so that there is maximum cancellation of the unwanted three orientations yields a different set of Euler angles, relative Rabi frequencies, cycle lengths and projection weights:

The relevant theory will be explored below. But first, it will be noted that as presented above with respect to the temperature example, it can be preferred to limit the amount of measurements performed by operating in a relative manner, which can involve making a set of measurements at a single, locked frequency, and using prior calibration to associate changes in amplitude to shifts of a given dip along the frequency axis, and secondly, we will explore the main elements of a potential system which can be used to perform this technique.

Indeed, in the context of performing measurements at a given frequency and using prior calibration to map a change in amplitude to a shift of the central frequency of a given peak, to a certain extent, sensitivity may be optimized when the measurement of the magnetic field is done by setting the microwave frequency to be at the point of maximal slope of the resonance lines.

Figure 12:
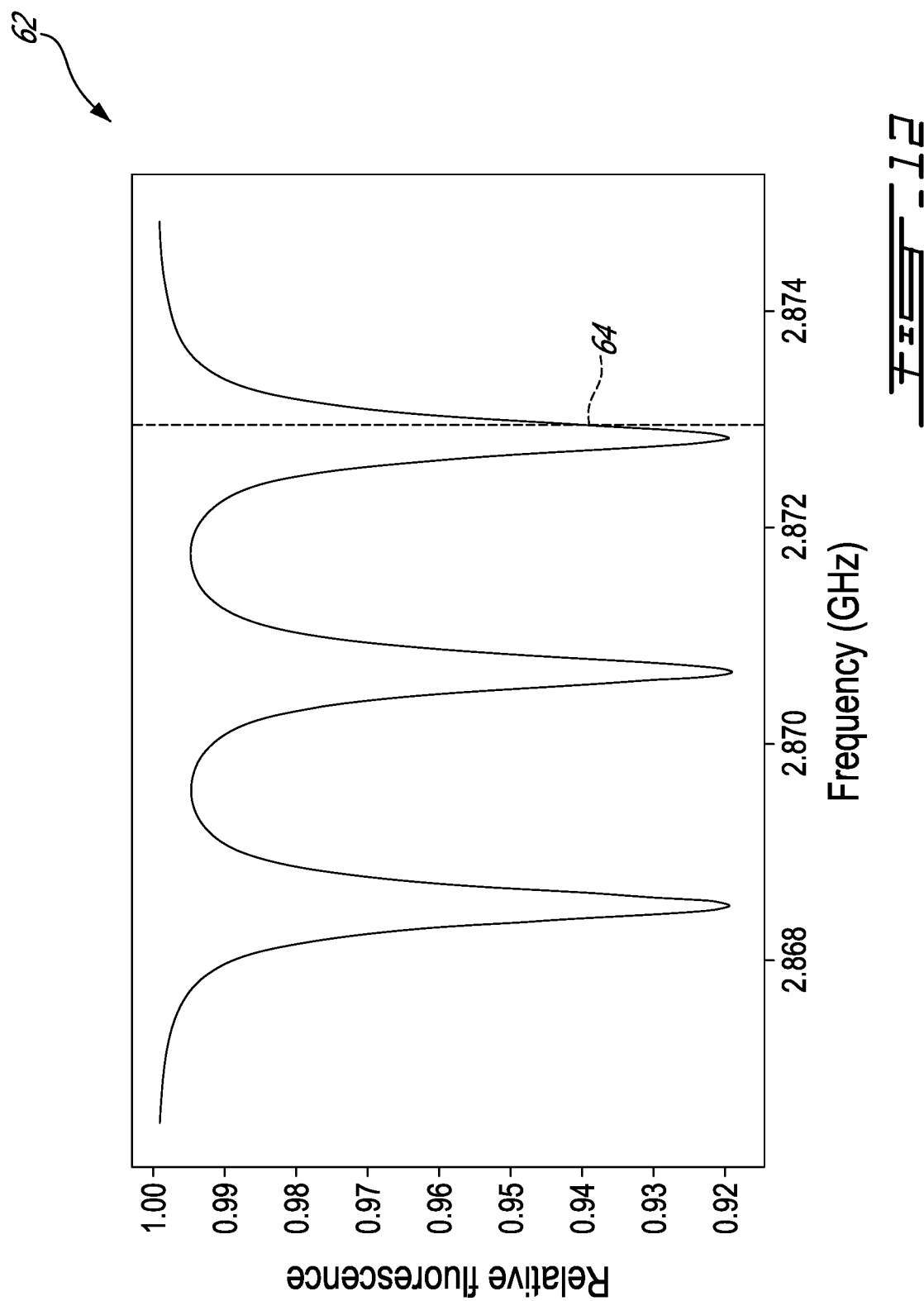
FIG. 12 schematizes a setpoint corresponding to the point of maximal slope of the resonance line represented by a dashed vertical line.

For a Lorentzian line shape with a full width at half maximum (HWHM) of Γ, this point can be at $f_0 \pm \Gamma/\sqrt{3}$, where $f_0$ is the frequency at the centre of the peak. As schematized in the graph 62 of FIG. 12, a setpoint 64 corresponding to the point of maximal slope of the resonance line is illustrated by the dashed vertical line. As the magnetic field and temperature changes shift the resonance line, a change in the fluorescence readout at the setpoint 64 can be of:

$$\phi_i = \frac{3\sqrt{3}}{8} \frac{C_i}{\Gamma_i} (\bar{\gamma} B_1 + c_T \Delta T)$$

Here, the prefactor can be the maximal slope of the Lorentzian line shape, with $C_i$ and $\Gamma_i$ being the normalized contrast and the linewidth of the resonance line corresponding to the ith orientation. $B_i$ is the projection of the field on this ith orientation and ΔT is the temperature change compared to the moment the setpoint was chosen. The constants $\bar{\gamma}$ and $c_T$ denote the movement of the resonances in response to the magnetic field and temperature changes and can be equal to respectively 28 Hz/nT and −79 Hz/mK in the case

TABLE 1

PARAMETERS OPTIMIZED FROM THE POINT OF VIEW OF MAXIMIZING CANCELLATIONS OF OTHER ORIENTATIONS INDEPENDENTLY OF MEASUREMENT CYCLE LENGTH

| Euler angles | Pitch | | 22.5° | | |
|---|---|---|---|---|---|
| | Roll | | 17.1° | | |
| Relative Rabi Frequencies | | 0.819 | 0.895 | 0.461 | 0.991 |
| Measurement cycle length (multiple of single π-pulse) | | 7 | 7 | 1 | 5 |
| Projection on $m_s = \pm 1$ | Measurement 0 | 1 | 0.27 | 0.01 | 0.46 |
| | Measurement 1 | 0.35 | 1 | 0.34 | 0.15 |
| | Measurement 2 | 0.12 | 0.01 | 1 | 0.06 |
| | Measurement 3 | 0.04 | 0.52 | 0.24 | 1 |

Here again, in alternate embodiments, it can be preferred to use different values of cycle length, pitch and roll angles. For instance, it can be preferred in some embodiments to limit the multiple of single π-pulses to less than 7, such as to increase contrast for instance, or to optimize for a lesser amount of orientations, to name some examples.

This being said the measurements are relatively independent—unwanted (off-diagonal) orientations can be suppressed by 48% in the worst case. Intuitively speaking, this means that the contributions of individual orientations can be well-separable in a simple linear algebra analysis.

of NV defects. These comparable scales imply that a change of a nT is comparable to a mK temperature change, and that a relatively high degree of precision can be required over both temperature and field.

Here as well, it will be understood that if the temperature shifts can be factored out using another technique, such as perhaps keeping the temperature constant, and if a lesser amount of dimensions is required for the magnetometry, such as requiring only 2D orientation $B_x$ and $B_y$ for instance, the measurement can be simplified to a 3-part or 2-part measurement. A uniaxial scalar magnetometer could also be implemented with a 1 part measurement in applications where the magnetic field in the other axes remains constant throughout the measurement, for instance.

Figure 13:
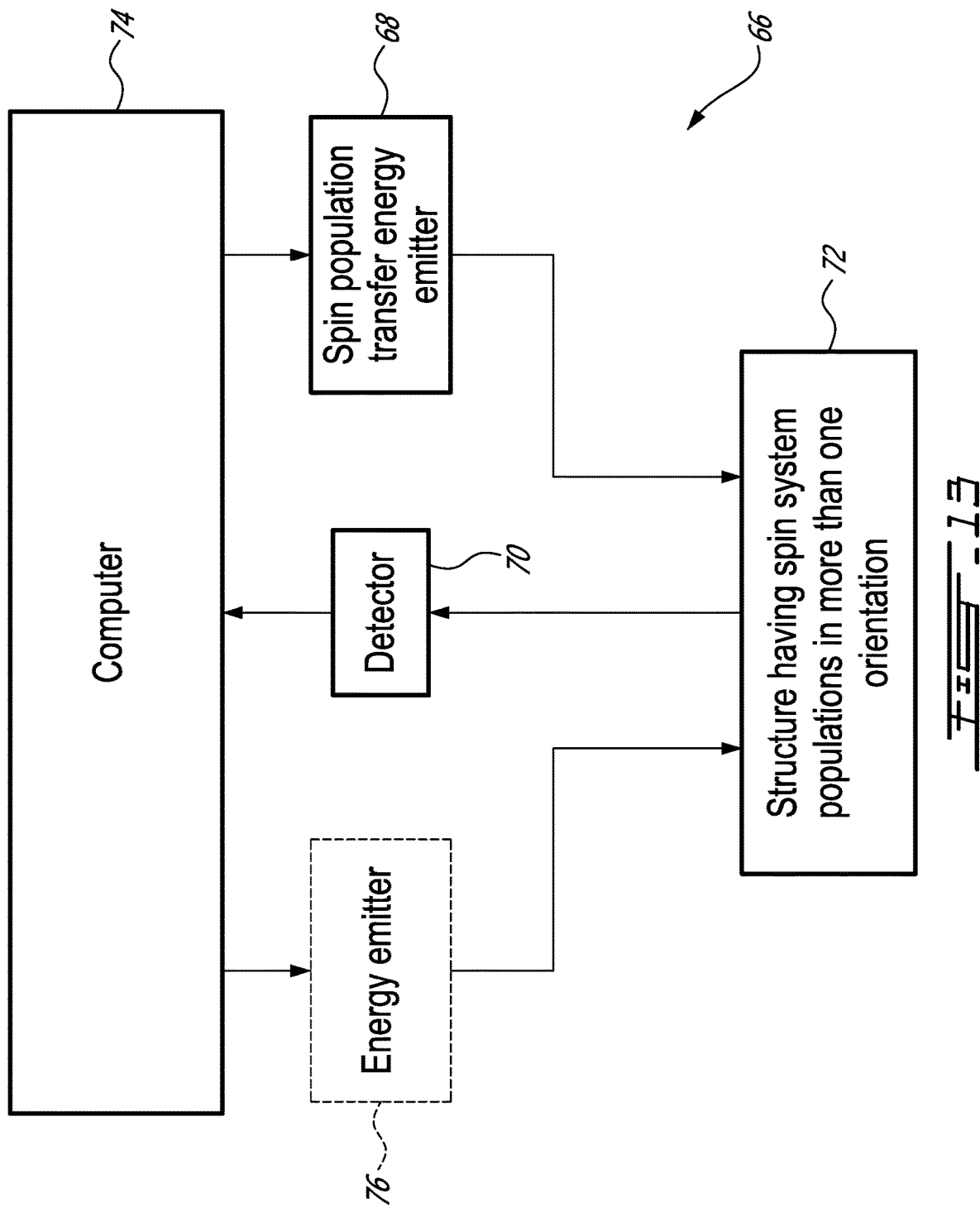
FIG. 13 is a block diagram of an example system which can be used as a vectorial magnetometer.

Such a technique can be embodied using a system 66 such as shown in FIG. 13. The crystalline substrate 12 can have NV defects 10 having spin transfers in at least three-different orientations. These transfers can also be sensitive to the magnetic field to be vectorially measured. More specifically, a spin population transfer energy emitter 68 and a detector 70 can be used to provide the spin transfer energy in the crystalline substrate 12, or to another structure having spin system population in more than one orientation 72 and to detect the transitions, respectively. In the case of NV defects 10 in diamond, a traditional ODMR system can be used, for instance, further having an electron level transition energy emitter 76 in the form of a green laser, for instance. The detector 70 can be adapted to detect an intensity of energy such as radiation in the red portion of the optical spectrum generated by electrons returning to the base state from the excited state. In some other embodiments, the detector 70 is adapted to detect an intensity of energy such as radiation either reflected or absorbed at the spin-state-transferring energy. In alternate embodiments, the detector 70 is adapted to detect an intensity of energy such as a voltage change generated by the electrons oscillating between different spin states (e.g., transitions $m_s$=0 to $m_s$=-1 and $m_s$=0 to $m_s$=±1). The intensity of the energy that is measured by the system 66 can be an intensity of photon such as energy change affected by the spin state, photons, microwaves and/or voltage. The different elements or subsystems 68, 70, 72 can be controlled by a controller, which can be a computer 74 in this particular embodiment.

One particularity of the spin population transfer energy emitter 68 of the system 66 shown in FIG. 13, is that it can provide the spin-state-transfer energy in a very specific matter to cause Rabi flopping in the defects. This Rabi flopping can have a frequency which does not depend on the energy value of the spin-state-transfer energy, but rather on the trigonometrical projection of this spin-state-transfer energy in the orientation of the interrogated defect. Moreover, the exact spin-state of the defects can be controlled based on pulse duration of the spin-state-transfer energy. Indeed, the spin-state can be controlled in such a precise manner so as to allow to precisely know the relationship that a pulse duration corresponding to π-pulse duration for one of the defect orientations will have on proportion of the population transfers in the other defect orientations.

Indeed, in this example, the "spin-state-transfer energy" can be not only variable in energy value (e.g., frequency) in order to allow performing the initial step of measuring the spin-affected intensity values (e.g., identifying the different dips), but also operable at precisely controlled pulse durations which can be varied while maintaining the energy value locked at a given frequency but measurably different relative projections on the different defect orientations.

For a given value of spin-state-transferring energy (e.g., a given dip in the example presented above), spin-state-transferring energy is provided at that energy value. However, that spin-state-transferring energy is provided at specific conditions. These conditions include given relative orientations in a manner to project different amplitudes on the given axes. Alternately, the different relative orientations can be imparted differently such as via different waveguides (e.g. wires), activated simultaneously or sequentially.

So far, the problem was studied analytically for an ideal setting. Even though this treatment allows for rigorous formulae and derivations, it ignores important features of the system's behavior, for example the effects of decoherence and inhomogeneities in the hyperfine lines' contrasts. In some embodiments, such features may have a significant impact on the optimal setpoint selection acquired simply by the technique presented earlier. In order to account for such features, a numerical model, building on the analytical model, is introduced herein.

According to theory, each line contributes a Lorentzian shape to the overall signal. Let A be that contribution, with $f_0$ and $f_{mw}$, being the bare Rabi frequency and the center microwave frequency of the oscillation, respectively.

$$A = \frac{f_0^2}{f_0^2 + (f - f_{mw})^2}$$

Now, each of the points on this line oscillates in time at a frequency $f_R$.

$$f_R = \sqrt{f_0^2 + (f - f_{mw})^2}$$

The fluorescence of each line, $F(t,f|f_0,f_{mw})$, can then be formulated as follows. The vertical bar separates the function arguments, the pulse length t and the driving frequency f, from the model parameters, namely $f_0$ and $f_{mw}$.

$$F_{chevron}(t,f|f_0,f_{mw}) = 1 - A \sin^2(2\pi f_R t)$$

According to theory, the effect of environmental noise can be modeled has a Gaussian distribution around the field value sensed by each NV center. We note the noisy fluorescence as $\tilde{F}(t,f|f_0,f_{mw},\delta)$, where $\delta$ is the mean of this deviation. For convenience, we set its standard deviation to b=0.5 MHz. Since this integral has different values for different values of $\delta$, we choose to evaluate it numerically in practice.

$$\tilde{F}_{chevron}(t, f | f_0, f_{mw}, \delta) = \int_{-\infty}^{\infty} F_{chevron}(t, f | f_0, f_{mw}) \frac{1}{\sqrt{2\pi}b} e^{\frac{-(x+\delta)^2}{2b^2}} dx$$

Because of hyperfine interactions, each line is the sum of three contributions, with a separation dictated by the hyperfine splitting of 2.16 MHz.

$$\tilde{F}_{triplet}(t, f | f_0, f_{mw}) = \tilde{F}_{chevron}(t, f | f_0, f_{mw}, -2.16) +$$
$$\tilde{F}_{chevron}(t, f | f_0, f_{mw}, 0) + \tilde{F}_{chevron}(t, f | f_0, f_{mw}, 2.16)$$

Since we have four NV defect orientations with two spin projections each, we expect the total fluorescence to be the sum of eight triplet lines.

$$\tilde{F}(t, f | f_0, f_{mw}) = \sum_{i=0}^{8} \tilde{F}_{triplet}(t, f | f_{0,i}, f_{mw,i})$$

Other features can be readily added to the model, for example, asymptotic values for long times and a fluorescence rescaling for each triplet.

Selecting the setpoints:

In order to find the setpoints given a model for the chevron, we propose a general framework within which different strategies can be devised. A few points must be considered when designing a strategy, namely: 1) Each setpoint should be highly sensitive to the changes of at least one center frequency $f_{mw}$; 2) For each $f_{mw}$, at least one setpoint should be highly sensitive to its changes; 3) To avoid stability issues, no two setpoints should be sensitive in the same way to changes in all $f_{mw}$; 4) To select the points, one can use a combination of derivatives of any order with respect to any model parameter.

Next are presented some example strategies with different figures of merit optimizing sensitivity, separation, stability, and dynamic range.

For optimal sensitivity to the shift of frequency of the resonance lines, a relatively simple strategy consists in choosing the minimal number of points, namely four, using the derivatives of the chevron fluorescence with respect to each of the $f_{mw}$. This strategy is technically susceptible to stability issues, but we expect it not to be the case in practice.

For 0<i<4:

$$\text{setpoint}_i = (t_i, f_i) = \max(\partial_{f_{mw,i}} \tilde{F}(t, f \mid f_0, f_{mw}))$$

While still looking for high sensitivity we can look for points close to maximal slope but that minimize the contribution of other lines to avoid any potential limitations in stability.

Let $\Phi_i$ be the preimage of the fluorescence for which the derivative is above some cutoff value, say 90% of its max for illustration purposes.

$$\Phi_i = \{(f, t) | \partial_{f_{mw,i}} \tilde{F} > 0.9 \max \partial_{f_{mw,i}} \tilde{F}\}$$

$$\text{setpoint}_i = \max_{\Phi_i} \left( \min_{i \neq j} |\partial_{f_{mw,j}} \tilde{F}(t, f|f_0, f_{mw}) - \partial_{f_{mw,i}} \tilde{F}(t, f|f_0, f_{mw})| \right)$$

Combining the first three guidelines of strategy design, we choose more than four setpoints, i.e., an overcomplete measurement, where the goal of a setpoint is to maximize the separation between one of the six pairs of lines. The intuition is that we combine high sensitivity and large separation, which should, by construction, alleviate any stability issue. Note that there is no guarantee that the setpoints will all be different, which is not a problem in and of itself.

For 0<i≤j<4

$$\text{setpoint}_{i,j} = \max |\partial_{f_{mw,j}} \tilde{F}(t,f|f_0,f_{mw}) - \partial_{f_{mw,i}} \tilde{F}(t,f|f_0,f_{mw})|$$

To minimize fast changes in the setpoints as the field is evolving, we can maximize the size of frequency interval around each setpoint for which the first derivative is still close to the maximum. To do this in practice, we can proceed either by direct numerical search or by combination of higher order derivatives.

Example Method of Isolating Temperature and Magnetic Field Strength in Each Orientation Let us consider measurement i, which involves a $n_i\pi$-pulse tuned for the setpoint of the ith orientation. We then have:

$$t_i = \frac{n_i \pi}{\Omega_{Ri}} = \frac{n_i}{2 f_{Ri}}$$

Where:

$$\Omega_{Ri} = \sqrt{\Omega_{Ri}^2 + \left(2\pi \frac{\Gamma}{\sqrt{3}}\right)^2} \rightarrow \tilde{f}_{Ri} = \sqrt{f_R^2 + \left(\frac{\Gamma}{\sqrt{3}}\right)^2}$$

Denotes the detuned Rabi frequency of orientation i at a set point detuned by $\Gamma/\sqrt{3}$, so the point of maximum magnetic sensitivity of the Lorentzian lines. Alternately, and equivalently, a fixed pulse duration t could be used for all sequences while varying the fraction $\alpha_i$ of the maximal Rabi frequency $\Omega_{Ri}$ for each measurement instead, so to have:

$$t = \frac{n_i \pi}{\sqrt{\alpha_i^2 \Omega_{Ri}^2 + (2\pi\Gamma/\sqrt{3})^2}} \rightarrow \alpha_1 = \sqrt{\frac{1 - (2\pi\Gamma/\sqrt{3})^2 (n_i \pi/t)^2}{\Omega_{Ri}}} \left(\frac{n_i \pi}{t}\right)$$

This is one of some possible alternatives. In this case, the mathematical treatment of the rest of the problem does not change as all orientations are affected equally. Note that in this example, the microwave power is sufficient given the duration, such that the solution has $\alpha_i \leq 1$.

The normalized final fluorescence from this orientation is:

$$F_f^{i,i} = 1 - \frac{3C_i}{4} + \frac{3\sqrt{3}}{8}\frac{C_i}{\Gamma_i}(\bar{\gamma}B_i + c_T \Delta T) = 1 - \frac{3C_i}{4} + \frac{3\sqrt{3}}{8}\frac{C_i}{\Gamma_i}\delta f_i$$

Where the second term denotes the nominal fluorescence change at the set point. The variable $\delta f_i$ is denoted as the total frequency shift of the resonance lines associated to orientation i, which is a sum of the magnetic field related and temperature related frequency shifts:

$$\delta f_i = \bar{\gamma} B_i + c_T \Delta T$$

The other orientations, denoted by j≠i (e.g. upwardly oriented arrows on any one of FIG. 11A to FIG. 11D, oriented near $m_s=0$) will also contribute to the overall fluorescence in a lesser fashion. Since the rotation of the state is imperfect, the fluorescence change picks up a factor $\sin^2[\Omega_{Rj} t_i/2]$:

$$F_f^{i,j} = 1 - \left(\frac{3C_j}{4} + \frac{3\sqrt{3}}{8}\frac{C_j}{\Gamma_j}\delta f_j\right)\sin^2\left[\frac{\Omega_{Rj}t_i}{2}\right] =$$

$$1 - \left(\frac{3C_j}{4} + \frac{3\sqrt{3}}{8}\frac{C_j}{\Gamma_j}\delta f_j\right)\sin^2\left[\frac{n_i \pi}{2}\frac{\Omega_{Rj}}{\Omega_{Ri}}\right]$$

At the detuned point where $\Delta f_j = \bar{\gamma} B_j$, the (temporal) Rabi frequencies are given by:

$$f_R^{i,j} = \frac{\Omega_R^{i,j}}{2\pi} = \sqrt{f_{R0i}^2 + \left(\frac{\Gamma}{\sqrt{3}} + \delta f_i\right)^2} \approx \tilde{f}_{Rj} + \frac{1}{\sqrt{3}}\frac{\Gamma_j}{\tilde{f}_{Rj}}\delta f_j$$

Where the approximation is a first-order Taylor expansion that applies if $\bar{\gamma} B_j$ is small compared to $\Gamma$ and $f_{R0j}$. For fields on up to the uT level, this applies as the shift is on the order of ~10 KHz whereas $\Gamma$ and $f_{R0}$ are at least ten times bigger. Accordingly, if a 100 μT dynamic range is desired, a feedback loop can be used to dynamically change the set points.

We can further Taylor-expand the effect of the frequency shift out of the sines:

$$F_f^{i,f} \approx 1 - \left(\frac{3C_j}{4} + \frac{3\sqrt{3}}{8}\frac{C_j}{\Gamma_j}sf_j\right)\left(\sin^2\left[\frac{n_i\pi}{2}\frac{\bar{f}_{Rj}}{\bar{f}_{Ri}}\right] + \frac{n_i\pi}{z\sqrt{3}}\frac{\Gamma_j}{\bar{f}_{Ri}\bar{f}_{Rj}}\sin\left[n_i\pi\frac{\bar{f}_{Rj}}{\bar{f}_{Ri}}\right]\delta f_j\right)$$

The total normalized final fluorescence obtained by summing the contribution from every orientation is then (keeping only terms linear in Ba):

$$F_{ftot}^i = \bar{F}_{ftot}^i + \left(\frac{3\sqrt{3}}{8}\frac{1}{\Gamma_i}C_i\right)\delta f_i +$$

$$\sum_{j \neq i}\left(\frac{3\sqrt{3}}{8}\frac{1}{\Gamma_i}\sin^2\left[\frac{n_i\pi\bar{f}_{RJ}}{2\bar{f}_{R1}}\right]C_1 + \frac{3}{4}\frac{n_i\pi}{2\sqrt{3}}\frac{\Gamma_j}{\bar{f}_{Ri}\bar{f}_{Rj}}\sin\left[n_i\pi\frac{\bar{f}_{Rj}}{\bar{f}_{R1}}\right]C_j\right)\delta f_j$$

Where:

$$\bar{F}_{ftot}^i = 1 - \frac{3}{4}\left(C_1 - \sum_{j \neq 1}\sin^2\left[\frac{n_i\pi\bar{f}_{Rj}}{2\bar{f}_{Ri}}\right]C_j\right)$$

Is the normalized fluorescence at the setpoint without the application of any external field.

$$\delta F_{ftot}^m = F_{ftot}^i - \bar{F}_{ftot}^i$$

then denotes the change in normalized fluorescence from that setpoint.

Iterating over the other measurements, this whole problem can be recast as a set of four linear equations for the unknown fields:

$$\begin{pmatrix}\delta F_{ftot}^0 \\ \delta F_{ftot}^1 \\ \delta F_{ftot}^2 \\ \delta F_{ftot}^3\end{pmatrix} = \begin{pmatrix} q_{00} & q_{01} & q_{02} & q_{03} \\ q_{10} & q_{11} & q_{12} & q_{13} \\ q_{20} & q_{21} & q_{22} & q_{23} \\ q_{30} & q_{31} & q_{32} & q_{33}\end{pmatrix}\begin{pmatrix}\delta f_0 \\ \delta f_1 \\ \delta f_2 \\ \delta f_3\end{pmatrix}$$

Or:

$$\vec{\delta f_0} = Q^{-1}\vec{\delta F}_{tot}$$

With:

$$q_{ij} =$$

$$\frac{3\sqrt{3}}{8}\frac{1}{\Gamma_j}\left(\sin^2\left[\frac{n_i\pi}{2}\frac{\bar{f}_{Rj}}{\bar{f}_{Ri}}\right] + \frac{n_i\pi}{3}\frac{\Gamma_j^2}{\bar{f}_{Ri}\bar{f}_{Rj}}\sin\left[n_i\pi\frac{\bar{f}_{Rj}}{\bar{f}_{Ri}}\right]\right)C_j \to q_{ii} = \frac{3\sqrt{3}}{8}\frac{1}{\Gamma_i}C_i$$

The matrix elements being simple functions of the line shapes of the resonance lines ($\Gamma_i$, $C_i$) and of the Rabi frequencies at the setpoints $\bar{f}_{Ri}$. The line shapes can be modelized in any suitable shape, such as a Lorentzian fit or a Voigt profile perhaps. The reasoning presented above can be adapted to a different lineshape by changing the $3\sqrt{3}/8$ prefactor. The line shapes can be similar in this example.

The matrix is as such independent from the external magnetic field and simply needs to be properly calibrated for the sensor at hand.

The reconstruction of the vector magnetic field and of the temperature change is then easily accomplished. Given that the projection Ba of the magnetic field on orientation three is the following combination of the three other orientations (due to the geometry of the diamond crystal):

$$B_3 = -\frac{1}{\sqrt{3}}(B_0 + B_1 + B_2)$$

And using the following basis to convert from projections on the NV centres to cartesian axes:

$$\begin{pmatrix}B_0 \\ B_1 \\ B_2\end{pmatrix} =$$

$$\frac{1}{\sqrt{3}}\begin{pmatrix}1 & 1 & 1 \\ -1 & 1 & -1 \\ -1 & -1 & 1\end{pmatrix}\begin{pmatrix}B_x \\ B_y \\ B_z\end{pmatrix} \to \begin{pmatrix}B_x \\ B_y \\ B_z\end{pmatrix} = \frac{\sqrt{3}}{2}\begin{pmatrix}0 & -1 & -1 \\ 1 & 1 & 0 \\ 1 & 0 & 1\end{pmatrix}\begin{pmatrix}B_0 \\ B_1 \\ B_2\end{pmatrix}$$

We can relate the frequency shifts of the various orientations to the magnetic field and temperature changes:

$$\begin{pmatrix}\delta f_0 \\ \delta f_1 \\ \delta f_2 \\ \delta f_3\end{pmatrix} = \begin{pmatrix}1 & 0 & 0 & 1 \\ 0 & 1 & 0 & 1 \\ 0 & 0 & 1 & 1 \\ -1 & -1 & -1 & -1\end{pmatrix}\begin{pmatrix}\gamma B_0 \\ \gamma B_1 \\ \gamma B_2 \\ c_T\Delta T\end{pmatrix} =$$

$$\frac{1}{\sqrt{3}}\begin{pmatrix}1 & 0 & 0 & 1 \\ 0 & 1 & 0 & 1 \\ 0 & 0 & 1 & 1 \\ -1 & -1 & -1 & 1\end{pmatrix}\begin{pmatrix}1 & 1 & 1 & 0 \\ -1 & 1 & -1 & 0 \\ -1 & -1 & 1 & 0 \\ 0 & 0 & 0 & \sqrt{3}\end{pmatrix}\begin{pmatrix}\gamma B_x \\ \gamma B_y \\ \gamma B_z \\ c_T\Delta T\end{pmatrix}$$

And we finally get to the final equation relating measurements of the vector field and the temperature to the four fluorescence measurements from the sequence:

$$\begin{pmatrix}\gamma B_x \\ \gamma B_y \\ \gamma B_z \\ \sqrt{3}c_T\Delta T\end{pmatrix} = \frac{\sqrt{3}}{4}\begin{pmatrix}1 & -1 & -1 & 1 \\ 1 & 1 & -1 & -1 \\ 1 & -1 & 1 & -1 \\ 1 & 1 & 1 & 1\end{pmatrix}\begin{pmatrix}\delta f_0 \\ \delta f_1 \\ \delta f_2 \\ \delta f_3\end{pmatrix} = ZQ^{-1}\begin{pmatrix}\delta F_{ftot}^0 \\ \delta F_{ftot}^1 \\ \delta F_{ftot}^2 \\ \delta F_{ftot}^3\end{pmatrix}$$

The equation is as such quite simple: Z is a constant based on the properties of the diamond crystal, and Q is, as mentioned before, only dependent on the line shapes of the resonance lines and of the Rabi frequencies defined by the orientation of the crystal. The matrix is as such independent from the external magnetic field and simply needs to be properly calibrated for the sensor at hand. This measurement method thus permits a reconstruction of the vector magnetic field and of temperature fluctuations with a minimum number of free parameters.

Example Embodiment Using Generalized Model with Hyperfine Lines and Dynamic Setpoints The Earth's magnetic field may provoke the sensor to go out of its small (~µT level) dynamic range around the setpoint simply by rotating the sensor over itself. As such, working with a single tone of microwaves as in the previous experiment may not be sufficient. If we keep the same sequence as before, but with pulses that change not only in duration $t_i$ but also in frequency set point $f_{MW}^i$, we can solve the dynamic range issue and recover a similar type of the problem as in the previous section.

The resonance line shape and its derivative for orientation j subjected to the Earth field of $B_e$ are:

$$R_j[f] = \sum_{m=[-1,0,1]} \sum_{n=[-1,1]} \left( \frac{1}{1 + \left(\frac{(f-f_0) + m \cdot f_h + n \cdot \bar{\gamma} B_{\theta j} + c_T \Delta T}{\Gamma_j}\right)^2} \right) C_j$$

$$R'_j[f] = \frac{dR_j[f]}{df} =$$

$$\sum_{m=[-1,0,1]} \sum_{n=[-1,1]} 2 \left( \frac{(f-f_0) + m \cdot f_h + n \cdot \bar{\gamma} B_{\theta j} + c_T \Delta T}{\left(1 + \left(\frac{(f+f_0) + m \cdot f_h + n \cdot \bar{\gamma} B_{\theta j} + c_T \Delta T}{\Gamma_j}\right)^2\right)^2 \Gamma_j^2} \right) C_i$$

where $B_{ej}$ is the projection of the field of the Earth on orientation j. We thus have six peaks per orientation. To be at the point of maximal slope of the individual orientations, the microwave frequency of measurement i will be set at:

$$f_{MW}^i = [f_{NV} + \bar{\gamma} B_{ei} + f_h] + \frac{\Gamma_i}{\sqrt{3}} = f_{0i} + \frac{\Gamma_i}{\sqrt{3}}$$

This results in an extra detuning term for the two orientations $j \neq i$ that are not optimized for the pulse sequence, further changing their Rabi frequency to:

$$f_R^{i,j} = \frac{\Omega_{Rj}}{2\pi} = \sqrt{f_{R0j}^2 + \left(\bar{\gamma}(B_{\theta j} - B_{ei}) - \frac{\Gamma}{\sqrt{3}} + \bar{\gamma}\beta_j + c_T \Delta T\right)^2} \approx$$

$$\hat{f}_R^{i,j} + \frac{\hat{\gamma}(B_{\theta j} - B_{\theta i}) - \frac{\Gamma}{\sqrt{3}}}{\hat{f}_R^{i,j}} (\hat{\gamma} B_j + c_T \Delta T) = \hat{f}_R^{i,j} + \frac{\Delta f_{i,j}}{\hat{f}_R^{i,j}} \delta f_j$$

Where:

$$\hat{f}_R^{i,j} = \sqrt{f_{R0j}^2 + \Delta f_{i,j}^2}$$

and $$\Delta f_{i,j} = \hat{\gamma}(B_{\theta j} - B_{\theta i}) - \frac{\Gamma}{\sqrt{3}}$$

This detuning can bring a further decrease in the contribution of the two untargeted orientations as the peaks may be out of their dynamic range—as such, the cancellation can be even better in a case with multiple frequency set points. The difference in the Rabi frequencies of different orientations can be greater than the linewidth.

Generalizing from the previous sections, the fluorescence coming from orientation j for measurement i under a small field B will then be:

$$F_f^{i,j} \approx 1 - (R_{ij} + R'_{ij} \cdot \delta f_j) \cdot \sin^2 \left[ \frac{n_i \pi}{2} \frac{f_{Rj}^i}{\bar{f}_{Ri}} \right] \approx$$

$$1 - (R_{ij} + R'_{ij} \cdot \bar{\gamma} B_j) \cdot \left( \sin^2\left[\frac{n_i \pi}{2} \frac{\hat{f}_R^{i,j}}{\bar{f}_{Ri}}\right] + \frac{n_i \pi}{2} \frac{\Delta f_{i,j}}{\hat{f}_R^{i,j} \bar{f}_{Ri}} \sin\left[n_i \pi \frac{\hat{f}_R^{i,j}}{\bar{f}_{Ri}}\right] \delta f_j \right) \approx$$

$$1 - \sin^2\left[\frac{\pi}{2} \frac{\hat{f}_R^{i,j}}{\bar{f}_{Ri}}\right] R_{ij} - \left( \sin^2\left[\frac{n_i \pi}{2} \frac{\hat{f}_R^{i,j}}{\bar{f}_{Ri}}\right] R'_{ij} + \frac{n_i \pi}{2} \frac{\Delta f_{i,j}}{\hat{f}_R^{i,j}} \sin\left[n_i \pi \frac{\hat{f}_{Rj}^i}{\bar{f}_{Ri}}\right] R_{ij} \right) \delta f_j$$

Where $$R_{ij} = R_j[f_{MW}^i]$$

and $\bar{f}_{Ri}$ being equivalent to $$\hat{f}_R^{i,i}.$$

The nominal fluorescence at the set-point is thus:

$$\bar{F}_{ftot}^i = 1 - \sum_j \sin^2\left[\frac{n_i \pi}{2} \frac{\hat{f}_R^{i,j}}{\bar{f}_{Ri}}\right] R_{ij}$$

And the matrix elements are:

$$q_{ij} = \sin^2\left[\frac{n_i \pi}{2} \frac{\hat{f}_R^{i,j}}{\bar{f}_{Ri}}\right] R'_{ij} + \frac{n_i \pi}{2} \frac{\Delta f_{i,j}}{\hat{f}_R^{i,j} \bar{f}_{Ri}} \sin\left[n_i \pi \frac{\hat{f}_R^{i,j}}{\bar{f}_{Ri}}\right] R_{ij}$$

We still have a system of equations of the following form:

$$\begin{pmatrix} \bar{\gamma} B_x \\ \bar{\gamma} B_y \\ \bar{\gamma} B_z \\ c_T \Delta T \end{pmatrix} = ZQ^{-1} \begin{pmatrix} \delta F_{ftot}^0 \\ \delta F_{ftot}^1 \\ \delta F_{ftot}^2 \\ \delta F_{ftot}^3 \end{pmatrix}$$

Where $$\delta F_{ftot}^i = F_{ftot}^i - \bar{F}_{ftot}^i$$

is the difference in nominal fluorescence from the value at the set point.

In total, the problem can thus be resolved by obtaining four (4×4) matrices:
  R, the normalized fluorescence of orientation j for the $i^{th}$ measurement;
  R', the slope of the normalized fluorescence of orientation j for the $i^{th}$ measurement;
  Δf, the detuning of the orientation j from the frequency setpoint of the $i^{th}$ measurement; and
  $\hat{f}_R$, the Rabi frequency of orientation j at the frequency setpoint of the $i^{th}$ measurement.

Recast in this form, we have:

$$Q = \sin^2\left[\frac{n_i\pi}{2}\frac{\hat{f}_R}{\bar{f}_R}\right]R' + \frac{n_i\pi}{2}\frac{\Delta f}{\bar{f}_R\bar{f}_R}\sin\left[n_i\pi\frac{\hat{f}_R}{\bar{f}_R}\right]R = Q_0 + Q_1$$

Physically speaking, the first term can be seen as the "slope detection" term arising from the fluorescence changing due to a movement of the line on the frequency spectrum, while the second one is due to a change in the Rabi frequency due to the detuning induced by the magnetic field and temperature changes.

Worked-Out Example 1—True Zero Field

Let us now imagine a situation where the external field is truly zero, such that all eight groups of resonance peaks are perfectly overlapping, and where the microwave cavity has a maximum Rabi frequency of 1 MHz. We now obtain the relevant matrices required to back out Q:

$\Delta f = 0.12 \cdot 10^6$ Hz

In the true zero field case, the detuning is equal to $\Gamma/\sqrt{3}$ for all orientations and all measurements. The same goes for the fluorescence and the slopes:

$$\frac{R}{C} = 0.76 \quad R' = -326 \text{ GHz}^{-1}$$

The Rabi frequency of each orientation for each experiment is a matrix of similar rows given that all the lines perfectly overlap:

$$\hat{f}_R = \begin{pmatrix} 0.83 & 0.90 & 0.47 & 1.00 \\ 0.83 & 0.90 & 0.47 & 1.00 \\ 0.83 & 0.90 & 0.47 & 1.00 \\ 0.83 & 0.90 & 0.47 & 1.00 \end{pmatrix} \cdot 10^6 \text{ Hz}$$

The resulting $Q_0$ and $Q_1$ matrices are:

$$Q_0 = -\begin{pmatrix} 326 & 119 & 51 & 16 \\ 94 & 326 & 8 & 174 \\ 0 & 74 & 326 & 102 \\ 136 & 52 & 8 & 326 \end{pmatrix} \cdot 10^{-9} \text{ Hz}^{-1}$$

$$Q_1 = \begin{pmatrix} 0 & -125 & 25 & -36 \\ 117 & 0 & 10 & -76 \\ -15 & 189 & 0 & -135 \\ -115 & 78 & -9 & 0 \end{pmatrix} \cdot 10^{-9} \text{ Hz}^{-1}$$

The total matrix $Q_0+Q_1$ will be mostly diagonal, but both $Q_0$ and $Q_1$ provide significant off-diagonal elements, such that both the "slope detection" and "Rabi frequency change" readouts they respectively cause contribute appreciably to the final signal. The inverse matrix reads:

$$Q^{-1} = \begin{pmatrix} -2.15 & -1.41 & -1.59 & 1.62 \\ 1.61 & -1.87 & 0.29 & -1.41 \\ 0.23 & 0.01 & -3.07 & -0.02 \\ -1.06 & -1.66 & 2.27 & -2.24 \end{pmatrix} \cdot 10^6 \text{ Hz}$$

$Q^{-1}$ tells us how well-separated the different measurements of the total fluorescence are.

We ultimately have:

$$\begin{pmatrix} \gamma B_x \\ \gamma B_y \\ \gamma B_z \\ c_T \Delta T \end{pmatrix} = ZQ^{-1}\begin{pmatrix} \delta F^0_{ftot} \\ \delta F^1_{ftot} \\ \delta F^2_{ftot} \\ \delta F^3_{ftot} \end{pmatrix} = \begin{pmatrix} -1.38 & 0.10 & 1.53 & -1.49 \\ -1.18 & -0.69 & 1.44 & 1.45 \\ -1.44 & 1.54 & 0.37 & 0.73 \\ -0.71 & 0.31 & 0.63 & 0.85 \end{pmatrix}\begin{pmatrix} \delta F^0_{ftot} \\ \delta F^1_{ftot} \\ \delta F^2_{ftot} \\ \delta F^3_{ftot} \end{pmatrix} \cdot 10^6 \text{ Hz}$$

As the conversion from normalized fluorescence to the magnetic field vector and the temperature shifts.

Worked-Out Example 2—Realistic Earth Field

Let us set an external field of $B_e=(10,20,50)$ uT such as to match the ambient magnetic field in Sherbrooke, Canada. The lines have $\Gamma=0.2$ MHZ and C=0.01. The maximum Rabi frequency achievable by the cavity is 1 MHZ. The normal (continuous-wave) ODMR looks as shown in graph 52 of FIG. 4.

We now obtain the relevant matrices:

$$\Delta f = \begin{pmatrix} -0.12 & 0.81 & 1.29 & 0.43 \\ -1.04 & -0.12 & 0.36 & -0.50 \\ -1.53 & -0.59 & -0.12 & -0.92 \\ -0.66 & 0.27 & 0.74 & -0.12 \end{pmatrix} \cdot 10^6 \text{ Hz}$$

By inspection, this matrix works. It is an antisymmetric matrix when applying an offset of $\Gamma/\sqrt{3}$, the opposite of the nominal offset of the set points found on the diagonal.

$$\frac{R}{C} = \begin{pmatrix} 0.76 & 0.08 & 0.08 & 0.19 \\ 0.04 & 0.76 & 0.25 & 0.15 \\ 0.02 & 0.11 & 0.76 & 0.05 \\ 0.09 & 0.37 & 0.09 & 0.76 \end{pmatrix}$$

$$R' = \begin{pmatrix} -326 & 10 & -8 & 66 \\ -7 & -326 & 97 & -49 \\ -2 & -31 & -326 & -8 \\ -24 & 172 & 14 & -326 \end{pmatrix} \text{GHz}^{-1}$$

The fluorescence matrix and slopes matrices are mostly diagonal, meaning that other orientations hardly contribute to the nominal fluorescence change for the selected $B_e$. We can see that the element [4, 2] in the matrix is higher, meaning that orientations 2 and 4 overlap on the $4^{th}$ measurement.

$$\hat{f}_R = \begin{pmatrix} 0.83 & 1.21 & 1.37 & 1.08 \\ 1.33 & 0.09 & 0.59 & 1.11 \\ 1.72 & 1.07 & 0.47 & 1.39 \\ 1.05 & 0.93 & 0.88 & 1.00 \end{pmatrix} \cdot 10^6 \text{ Hz}$$

We can see that the detuning plays a significant role in setting the Rabi frequency of each orientation for each measurement as the rows are quite different. In a case with a higher nominal Rabi frequency, the rows would be much more similar as the detuning would be less significant.

$$Q_0 = -\begin{pmatrix} 326 & 1 & 1 & 20 \\ -1 & 326 & 5 & -132 \\ 3 & -56 & 326 & -5 \\ -63 & 32 & 8 & 326 \end{pmatrix} \cdot 10^{-9} \text{ Hz}^{-1}$$

-continued $$Q_1 = \begin{pmatrix} 0 & -31 & 6 & 34 \\ 49 & 0 & -15 & 71 \\ -93 & 185 & 0 & 56 \\ -46 & -76 & -24 & 0 \end{pmatrix} \cdot 10^{-9} \text{ Hz}^{-1}$$

The total matrix $Q_0+Q_1$ will be mostly diagonal, but both $Q_0$ and $Q_1$ provide significant off-diagonal elements, such that both the "slope detection" and "Rabi frequency change" readouts they respectively cause contribute appreciably to the final signal. The inverse matrix reads:

$$Q^{-1} = \begin{pmatrix} -3.02 & -0.50 & 0.52 & -0.01 \\ 0.25 & -2.40 & -1.68 & 0.86 \\ -0.06 & 0.18 & -2.91 & 0.03 \\ 0.01 & -1.48 & -1.57 & -2.53 \end{pmatrix} \cdot 10^6 \text{ Hz}$$

$Q^{-1}$ tells us how well-separated the different measurements of the total fluorescence are. In this case, the last row of the matrix tells us that the fourth measurement has significant contributions from orientations 1,2,3 and nearly none from orientation 0.

We ultimately have:

$$\begin{pmatrix} \overline{\gamma} B_x \\ \overline{\gamma} B_y \\ \overline{\gamma} B_z \\ c_T \Delta T \end{pmatrix} = \begin{pmatrix} \delta F_{ftot}^0 \\ \delta F_{ftot}^1 \\ \delta F_{ftot}^2 \\ \delta F_{ftot}^3 \end{pmatrix} = \begin{pmatrix} -1.38 & 0.10 & 1.53 & -1.49 \\ -1.18 & -0.69 & 1.44 & 1.45 \\ -1.44 & 1.54 & 0.37 & 0.73 \\ 0.71 & 0.31 & 0.63 & 0.85 \end{pmatrix} \begin{pmatrix} \delta F_{ftot}^0 \\ \delta F_{ftot}^1 \\ \delta F_{ftot}^2 \\ \delta F_{ftot}^3 \end{pmatrix} \cdot 10^6 \text{ Hz}$$

As the conversion from normalized fluorescence to the magnetic field vector and the temperature shifts.

Sensitivity Penalty

The magnetic sensitivity given in a bias field experiment where we can easily isolate the different orientations is given by:

$$\eta_0^i = \left(\frac{dF_i}{dB_i}\right)^{-1} \sigma_F^i$$

The first term $$\frac{dF_i}{dB_i}$$

denotes the response of the normalized fluorescence system to a change in magnetic field in the orientation i. The higher the slope is, the better (lower) the sensitivity may be. For a Lorentzian line shape at the setpoint (highest slope), this corresponds to:

$$\frac{dF_i}{dB_i} = \frac{3\sqrt{3}}{8} \overline{\gamma} \frac{C_i}{\Gamma_i}$$

The second term $$\sigma_F^i$$

denotes the uncertainty in the measurement. In an optical readout, the fundamental limit is the randomness in the number of photons that we measure (photon shot noise). This randomness corresponds to:

$$\frac{1}{\sqrt{\Phi N}}$$

Where $\Phi$ is the number of fluorescence photons measured by unit time by NV centre, and N is the total number of NV centres. On top of this, in a pulsed ODMR measurement, we only measure for a certain fraction $t_R/t_{rot}$ of the total measurement sequence, such that we have:

$$\sigma_F^i = \frac{1}{\sqrt{\Phi N}} \sqrt{\frac{t_{tot}}{t_R}}$$

For an ultimate sensitivity of:

$$\eta_0^i = \left(\frac{3\sqrt{3}}{8} \overline{\gamma} \frac{C_i}{\Gamma_i}\right)^{-1} \frac{1}{\sqrt{\Phi N}} \sqrt{\frac{t_{tot}}{t_R}}$$

In the Zero-Bias Field experiment, since the readings combine multiple measurements, we have to perform a weighted addition of the uncertainty associated to each measurement:

$$(\eta_{ZBF}^i)^2 = \sum_j \left(\left(\frac{dF_j}{dB_i}\right)^{-1} \sigma_F^j\right)^2 = \sum_j (\overline{\gamma}^{-1} Q^{-1})_{i,j}^2 \left(\frac{1}{\sqrt{\Phi N}} \sqrt{\frac{t_{tot}}{t_R}}\right)^2$$

Each term of the sum is weighted by the corresponding element of the $Q^{-1}$ matrix. The sensitivity penalty against an experiment with a bias field is thus given by:

$$P_{ZBF} = \frac{\eta_{ZBF}^i}{\eta_0^i} = \left(\frac{3\sqrt{3}}{8} \overline{\gamma} \frac{C_i}{\Gamma_i}\right) \cdot \sqrt{\sum_j (\overline{\gamma}^{-1} Q^{-1})_{i,j}^2} = \left(\frac{3\sqrt{3}}{8} \gamma \frac{C_i}{\Gamma_i}\right) \sqrt{\sum_j (Q^{-1})_{i,j}^2}$$

For the true Zero-Bias Field example from earlier, this penalty is $P_{ZBF} \sim 1.2$, meaning that the sensitivity of the experiment is penalized by around 20%. In the game of magnetic sensitivities, this is largely insignificant. The case with a realistic field has a penalty of <1% on the magnetic field vector.

As a rule of thumb, the sensitivity penalty will be minimal if the elements of $Q^{-1}$ are close to $$\left(\frac{3\sqrt{3}}{8} \frac{C_i}{\Gamma_i}\right)^1.$$

For that to happen, the rows of Q itself must be linearly independent enough.

In a hypothetical case where all Rabi frequencies on all four orientations are the same for all measurements, the rows of Q can be nearly equal and $Q^{-1}$ then has very large matrix elements. For instance, if we have a magnetic field along z with equal Rabi frequencies, the elements of $Q^{-1}$ are up to $10^{22}$ (from $10^6$), such that the penalty is massive and the resulting magnetometer may be unusable. This being said, this will likely not occur in a scenario where the NV-center substrate is carefully positioned relative to the orientation of the transfer energy emitter. Indeed, for a NV-center substrate with different Rabi frequencies (roll, pitch, yaw adjusted), the worse penalty can be approximately 20% and happen at true zero field.

Stability Analysis

In the same vein that a mismatch in the predicted bias field and the actual bias field on one part in one million will induce an error in the precision of the measurement of the vector magnetic field by 1 nT, imperfect knowledge of certain parameters in the zero-bias field (ZBF) experiment will also lead to errors in the measurement. Among these parameters, we have:

The maximum Rabi frequency $f_{Rj}$ on each orientation;
The contrast $C_j$ of the resonance lines;
The linewidths $\Gamma_j$ of the resonance lines;
The precision over the frequency setpoints; and
The quantum decoherence.

Let us now ascertain the effect of an error in the estimation of each of these parameters.

i) Error on the Rabi Frequencies

An error on the estimation of a Rabi frequency would trigger a change in the $\hat{f}_R$ matrix. Let us assume that we have an error on the Rabi frequency of orientation 0, and that all other three estimations are fine. For magnetic fields of 1 nT pointing respectively in the x,y, and z directions, the fact that the field points in either x, y or z is still obvious with a +/−50% error.

We also note that a 50% error will lead to no more than a +/−50% offset in all components of the field. However, we note that the systematic error scales with the field—a 1000 nT field would yield an error having 1000 times the magnitude of a 1 nT field. Ultimately, a 10% accuracy on field measurements would require a 3% accuracy on the estimation of the Rabi frequencies.

ii) Error on the Contrast and the Linewidth

An error in the estimated contrast will change the fluorescence measurement as well as the slope. Let us imagine that the contrast of all lines change equally. If, in a given embodiment, the fit and stability of the resonance lines is not precise enough, the model can be expanded so as to continuously measure contrast/linewidth/centre. We note that an error on the contrast purely affects the scaling of the result, such that a 10% accuracy on field measurements would require a 10% accuracy on the estimation of the contrasts.

Finally, we observe that an error on the linewidth estimation will change both the scale and the direction of the reconstructed field. Nonetheless, the quantitative effect on the accuracy is similar to that of a contrast estimation error, such that 10% accuracy on field measurements would require a 10% accuracy on the estimation of the linewidths.

iii) Quantum Decoherence

Longer microwave pulses can also decrease the contrast of the resonance lines through quantum decoherence. Our samples are characterized by a decoherence time Ty that represents the time scale of the exponential decay of the contrast after the initialization of a quantum state. We anticipate a $$T_2^* \sim 1$$

μs, such that the 7π pulses of our sequence should be quicker than that. This corresponds to a 3.5 MHz Rabi frequency on the targeted orientations, and ideally a few times greater than that.

Calibrating the Nominal Rabi Frequencies, Contrast and Linewidths

As evidenced above, the reconstruction of the magnetic field and temperature fluctuations can depend on a precise knowledge of the Rabi frequencies $f_{0j}$ on each orientation j, as well as on the contrast $C_j$ and the linewidth $\Gamma_j$ of the resonance lines.

While the Rabi frequencies can be estimated from the parameters of the setup (maximum strength of the microwave field and angle of the diamond), knowing the Rabi frequencies to a less than 3% accuracy level may be achieved using an empirical calibration on the sensor at hand.

A common way to calibrate the Rabi frequencies is to vary the duration of microwave pulses of a certain frequency. The measurement is similar in spirit to the ones used for ZBF experiments; however, the duration of the pulses is swept. As the duration increases, the different orientations will rotate more and more around the Bloch sphere, eventually looping back to the initial position (in a "2π" pulse). This will create superimposed oscillations at the Rabi frequencies of the individual orientations that can then be identified through basic Fourier analysis.

Figure 14B:
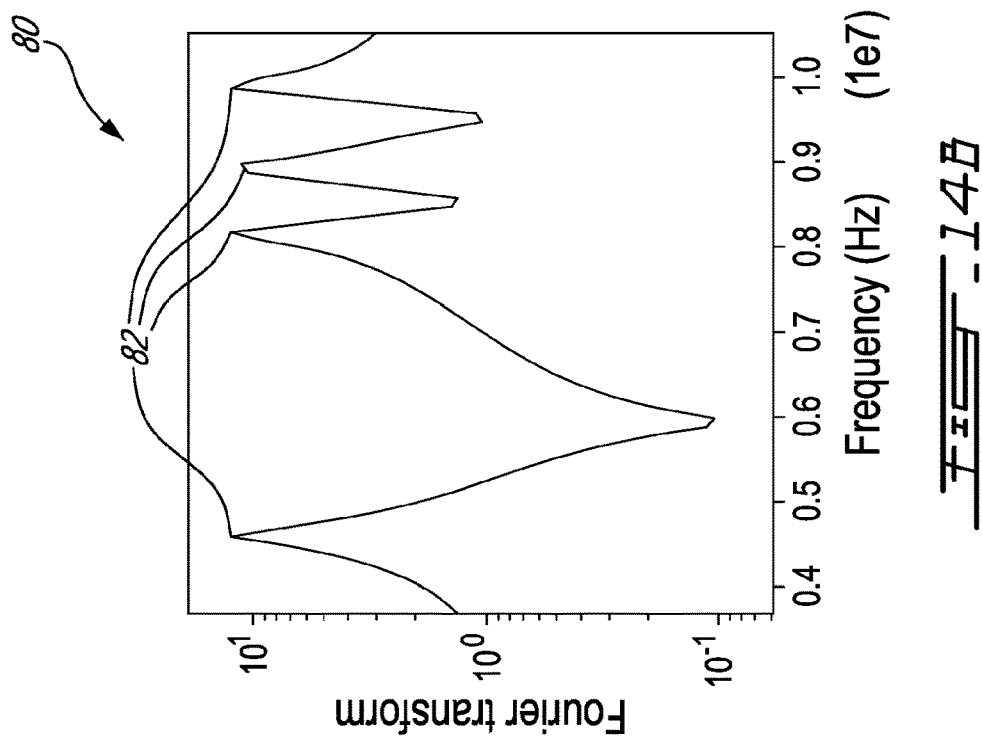
FIG. 14B shows a Fourier transform of the signal of FIG. 14A.
Figure 14A:
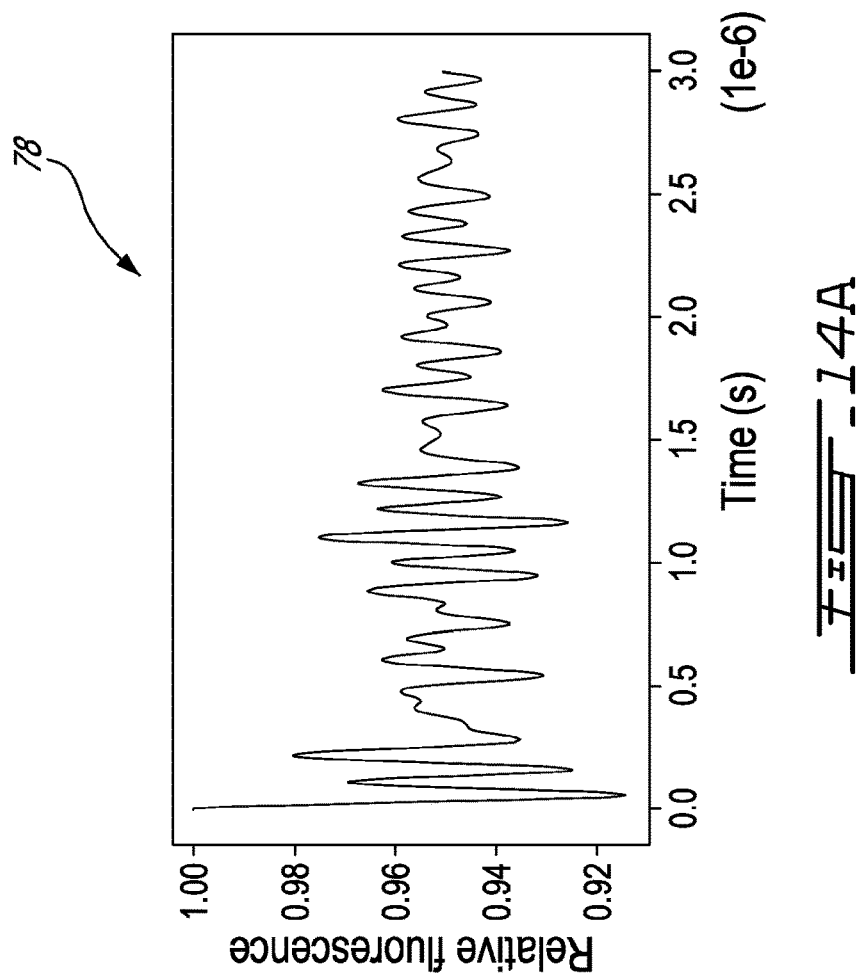
FIG. 14A shows a maximally busy resulting signal as a function of microwave pulse duration at a specific energy value if all NV orientations are overlapping perfectly, which can be used for calibrating Rabi frequencies.

The graph 78 shown in FIG. 14A displays the (maximally busy) resulting signal if all NV orientations are overlapping perfectly. The graph 80 shown in FIG. 14B displays the Fourier transform of this signal, which has peaks 82 at the accurate Rabi frequencies for all four orientations in the optimal measurement sequence shown in the introduction. This single measurement backs out the Rabi frequencies precisely provided that the signal-to-noise is high enough. In a noisier case, the measurement can simply be repeated until the estimates are satisfactory.

In our case, lines will not be overlapping perfectly due to the presence of the magnetic field of the Earth. This will make it such that the different lines will not all contribute equally to the signal above, as well as changing the Rabi frequencies of the individual orientations due to detuning $$\left( \mathcal{F}_R = \sqrt{f_{R0}^2 + \Delta f^2} \right).$$

As such, we will need to perform the sequence detailed above for multiple microwave pulse frequencies in order to identify the nominal (non-detuned) Rabi frequencies.

An advanced model based on this procedure will also fit for the contrast and the linewidth of the individual orientations, based on the dynamics of the FFT signal at these different microwave frequencies. This measurement also backs out the quantum decoherence time of the NV centres based on the decay of the relative fluorescence in time.

Observations

An example method to measure the vector magnetic field with NV centres in diamond without applying a bias magnetic field is presented above. The method relies on putting the diamond at an angle with respect to the applied microwave field that breaks the symmetry between the Rabi frequencies of the different orientations of the diamond. The measurement exploits the different rotation speeds of the quantum states of the different orientations around the Bloch sphere so to isolate specific orientations. With four measurements each aiming at isolating a specific orientation, the vector magnetic field as well as temperature fluctuations can be reconstructed.

An algorithm has been devised to find the optimal microwave pulse durations and diamond angles that will best isolate individual orientations. Given some maximum number of π-pulses, we obtain the following configurations:

| Maximum # π-pulses | Diamond (yaw, roll) angles (deg) | Rabi frequencies (relative) | # π- pulses |
|---|---|---|---|
| 1 | (15.3, 24.3) | (0.46, 0.81, 0.90, 0.99) | (1, 1, 1, 1) |
| 3 | (−20.7, 9.0) | (0.57, 0.76, 0.91, 0.97) | (1, 3, 3, 3) |
| 5 | (16.2, 29.7) | (0.40, 0.80, 0.93, 1.00) | (1, 5, 5, 5) |
| 7 | (22.5, 17.1) | (0.46, 0.82, 0.90, 0.99) | (1, 7, 7, 5) |

As it is advantageous to keep pulses as short as possible for stability and quantum decoherence reasons and to maximize the fraction of the measurement spent on readout, a maximum of $7^\pi$ pulses seems to be the sweet spot. An analysis of the magnetic sensitivity of this method gives a sensitivity penalty of less than 35% in the worst case, making abstraction of the decoherence effect. Going down to $5\pi$ gives a sensitivity penalty of at most 200%.

A stability analysis of the method shows that all errors will have an effect on the measurement that scales with the measurement itself. Having a 10% accuracy on the measurement implies:

An estimation of the Rabi frequencies of the individual orientations to <3%;

An estimation of the contrast of the resonance lines to <10%; and

An estimation of the linewidth of the resonance lines to <10%.

Of these, the contrast has purely a scaling effect on the measurement, whereas a misestimation of the linewidth and Rabi frequency will also change the direction of the reconstructed field.

Dynamic Range and Influence of Earth Field

In one example, measurement can be made by setting ourselves at the point of maximal slope of the Lorentzian function:

$$L(f) \propto \frac{1}{1 + \frac{(f-f_0)^2}{\Gamma^2}}$$

$$L'(f) \propto \frac{(f-f_0)}{\left(1 + \frac{(f-f_0)^2}{\Gamma^2}\right)^2}$$

Figure 15:
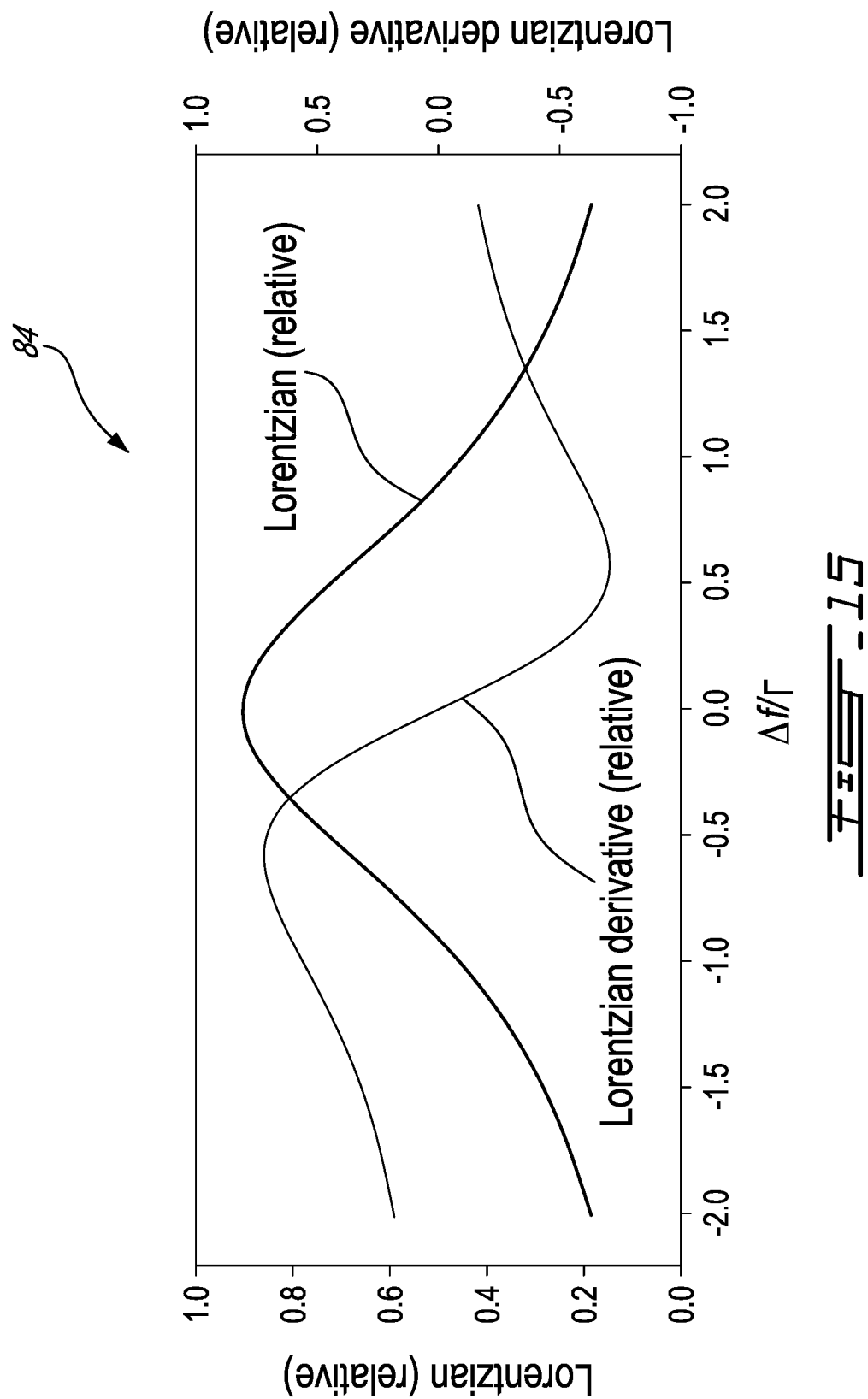
FIG. 15 is a graph presenting a Lorentzian function and its derivative.

The latter has extrema at $f=\pm\Gamma/\sqrt{3}\approx\pm0.58$ T and is presented in graph 84 of FIG. 15.

As seen, the slope is non-linear and drops to half of its maximal value at a range of [−0.8Γ,0.5Γ] from the setpoint. This represents a $\approx\pm2$ μT range over which the sensitivity is within a factor of two of its optimal value if the linewidth is around 0.2 MHz. This is a major issue under the influence of the field of the Earth, which will be over 50 μT in all surveys—a slight change in the direction of the sensor will require a recalibration.

Test Plan

In one example, in order to test the ZBF measurement scheme, the following steps can be followed:

Firstly, determine contrasts and linewidths of the resonance lines. This can be done by i) Fitting of the entire ODMR spectrum to 24 peaks in one shot, ii) using a bias field to separate the lines, only for the calibration step (this may be preferably avoided if the field is non-uniform, unless there is a very low field aligned with any individual NV axis), or iii) performing a bias-free sequence involving ODMRs taken with various microwave pulse lengths, to name three possible methods. It is possible to determine whether the fit is a Lorentzien or a Voigt profile.

Secondly, the Rabi frequencies of the sample can be determined. This can be done by using a bias field to separate the lines and fit a Ramsey sequence or performing a bias-free sequence involving ODMRs taken with various microwave pulse lengths, to name two examples. The Fourier transform of the Ramsey signal at a few MW setpoints can highlight frequencies.

Vector magnetic field measurements can be performed with a fixed sensor at fixed setpoints, working at high magnetic field to ensure that the method works with well separated lines, and working in high overlap situations (small external fields), and comparing with bias field measurements in mu-metal chambers, for instance, or with a rotating sensor.

The quantum control sequences can be provided for the following functionalities: a) alternation between multiple frequency set points, b) Setting of a different microwave pulse duration for each frequency setpoint, c) Dynamic updating of the multiple setpoints (for measurements that cover over 1 μT of range), for instance.

From experimental results, we can validate that it is possible to obtain different Rabi frequencies for different NV center orientations. In the following setup, a small bias field was applied to allow for better visibility of the resonance lines. This bias field does not change the Rabi frequencies of each resonance lines, but shifts their resonance microwave frequency.

Figure 16A:
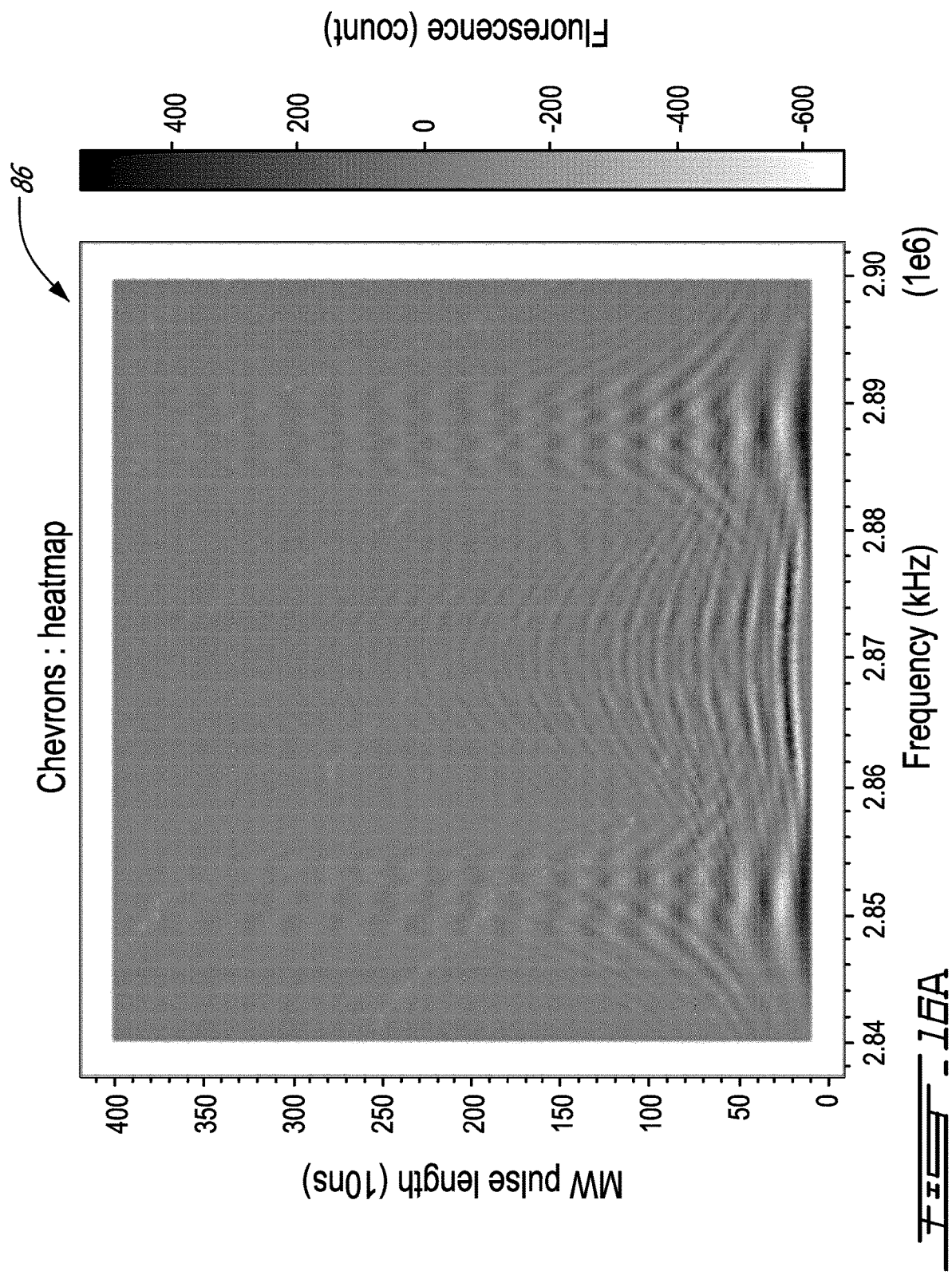
FIG. 16A shows a heatmap of the Rabi chevron of the amount of fluorescence plotted with respect to the microware drive frequency and microwave pulse duration.

The heatmap 86 shown in FIG. 16A represents the Rabi chevron, which is the amount of fluorescence plotted with respect to the microwave drive frequency and microwave pulse duration.

It is quite hard to read the four different Rabi frequencies in FIG. 16A. However, as is perhaps best seen in the heatmap 88 of FIG. 16B, going from the temporal domain to the frequency domain through a Fourier transform is a simple way to distillate the information.

Ignoring the patterns 90 at 12 MHz and higher, we can see the eight sets of resonance lines 92 (indicated by dotted line), each split in 3 hyperfine features 94. Each pair of resonance lines 92 appears at a unique Rabi frequency. From this data can be extracted the model parameters: maximum contrast, rabi frequency, center frequency, decoherence time.

Figure 16B:
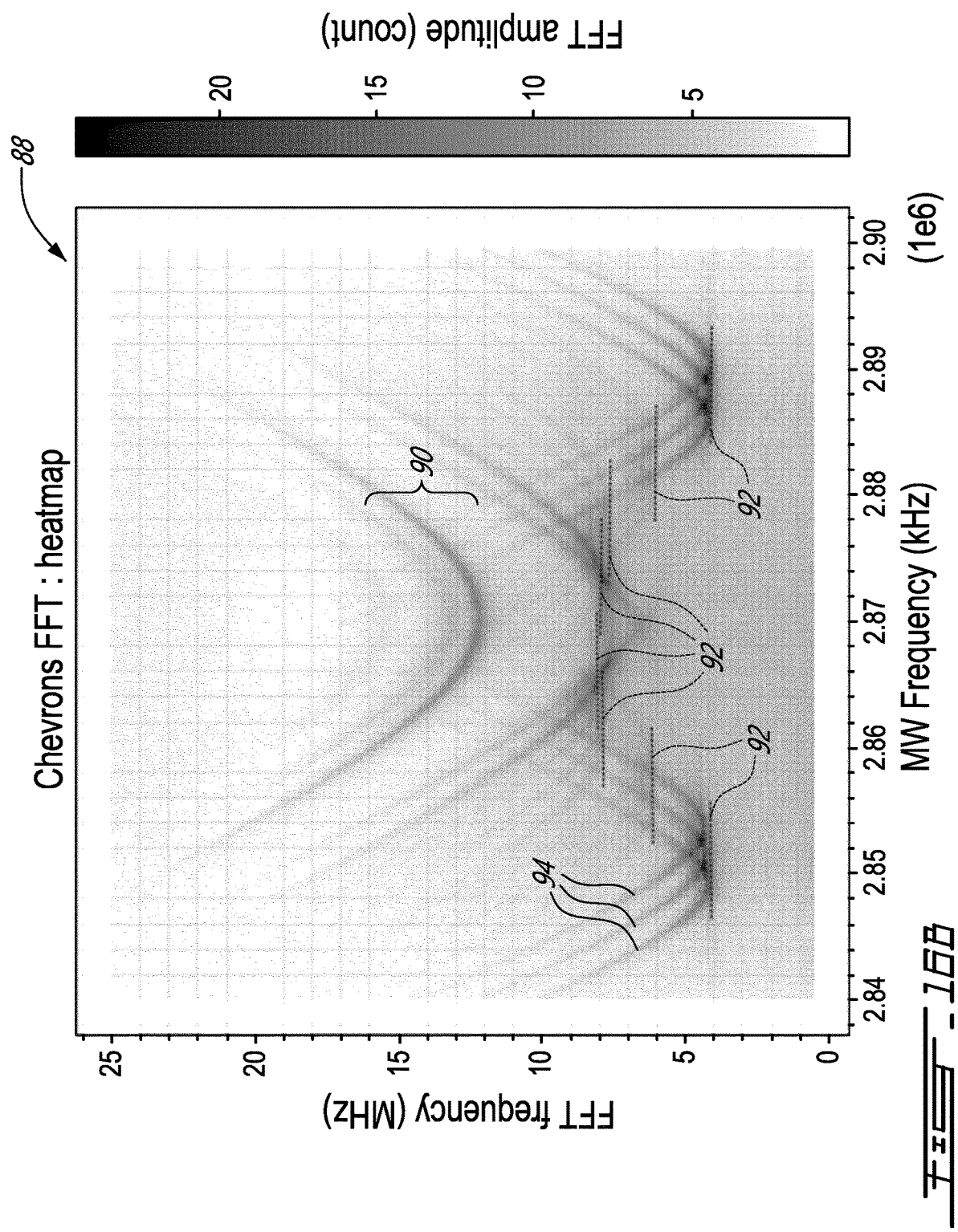
FIG. 16B shows the heatmap of FIG. 16A having been subject to a Fourier transform.

While the physical phenomenon responsible for the high frequency pattern visible in FIG. 16B is unknown (around 12 MHz and higher), its impact can be added to the model. In the event that this phenomenon, or others, were dependent on another external physical quantity, one or more setpoint(s) could be added to constrain the problem.

Figure 16C:
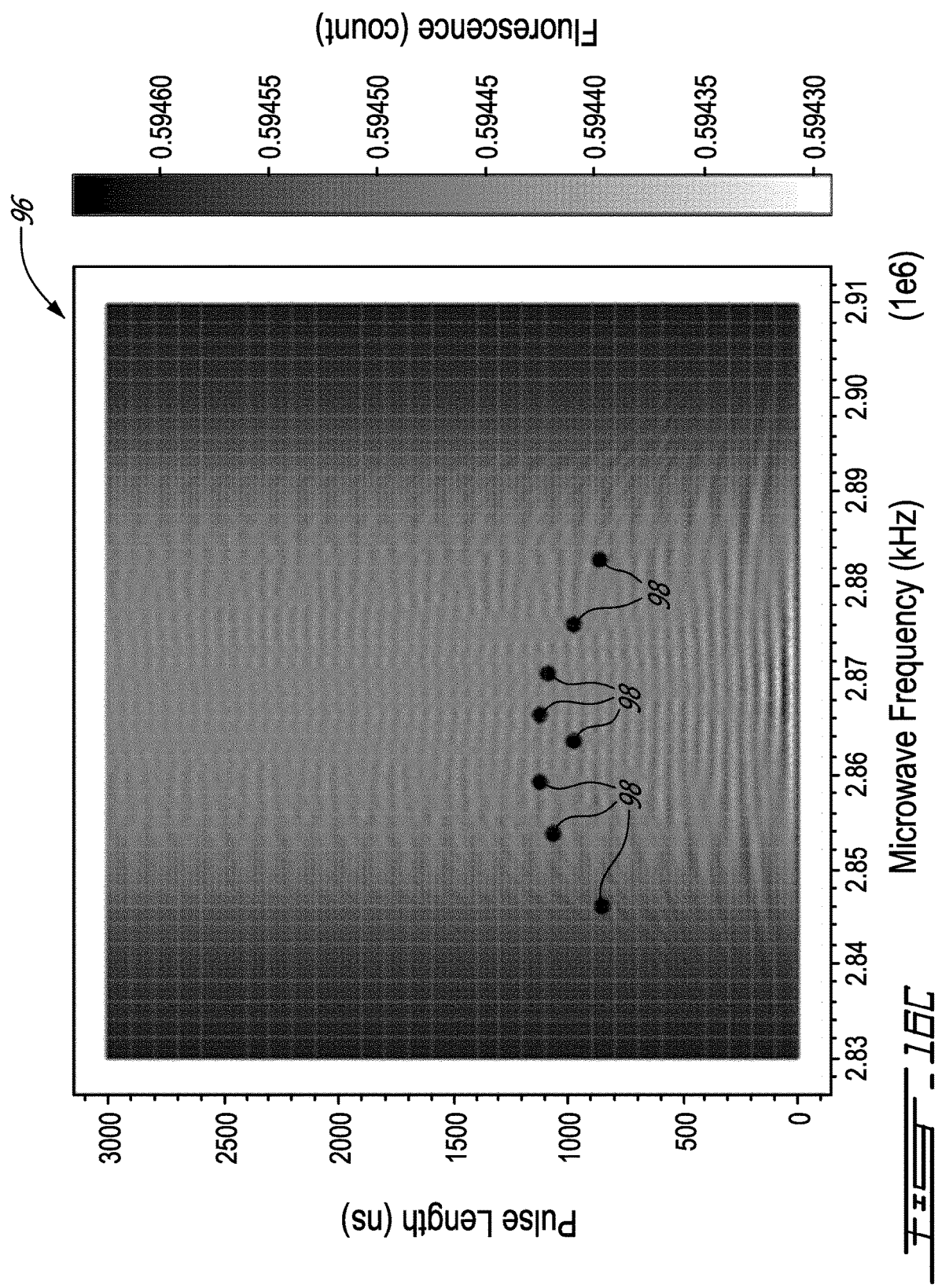
FIG. 16C shows the setpoints retrieved from the heatmap of FIG. 16B on the different resonance lines providing a maximised displacement of each corresponding resonance line in the configuration.
Figure 17:
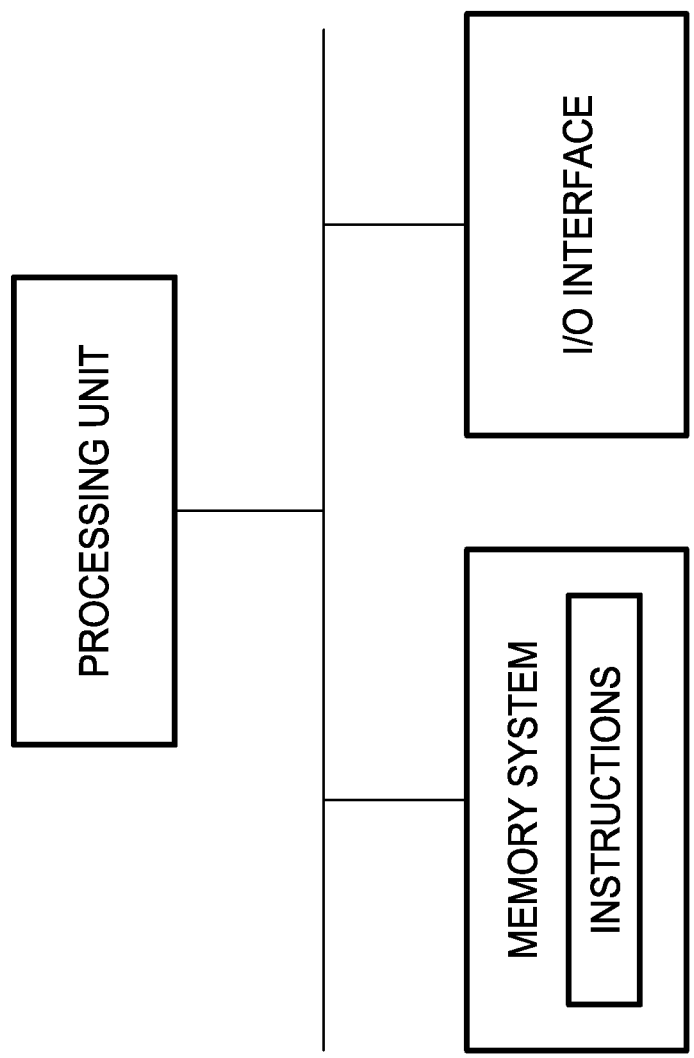
FIG. 17 is a block diagram of a computer which can be used as a controller.

As stated above, we can retrieve the setpoint by looking at the derivative of the chevron with respect to the center frequency of one resonance line and position the setpoint at the maximum of the derivative, in other words at the maximum slope. As is perhaps best seen in the graph 96 of FIG. 16C, the associated setpoint are found to be in a realistic field value (in Sherbrooke, Canada), at the positions of the black dots 98. Indeed, the effect of the displacement of one resonance line is maximised, for this particular configuration, when the microwave frequency corresponding to that point is emitted onto the diamond for the specific duration associated to that point.

By simulating a displacement, the center frequency of each of the 8 resonances lines 92 and reverting the photoluminescence signal at these 8 operating points back to center frequency displacement, we retrieve the original displacement. The error (of less than 1%) can come from numerical approximation and non-linearity of the curves, which would be compensated by implementing a resonance lines tracking behavior on top of the operating point selection.

| Resonance line ID | #1 | #2 | #3 | #4 | #5 | #6 | #7 | #8 |
|---|---|---|---|---|---|---|---|---|
| Center frequency displacement (kHz) | −1.0 | 0.0 | 1.0 | 2.0 | −2.0 | −1.0 | 0.0 | 1.0 |
| Retrieved displacement (kHz) | −1.0008 | −0.0037 | 1.0023 | 2.0002 | −1.9987 | −1.0025 | 0.0012 | 0.9930 |

As can be understood, the examples described above and illustrated are intended to be exemplary only. Indeed, while the measurement of magnetic fields via spin state transfers in different orientations of NV defects in a diamond matrix met a strong commercial need at the time of filing this specification, it will be understood that the method of dissociating the transfer amplitudes specific to different orientations proposed herein can be useful in various alternate contexts. For instance, a substrate having NV defects in a diamond matrix may be used to measure electric fields rather than magnetic fields, for instance, and the method proposed herein can be useful for dissociating the amplitudes specific to different orientations used in sensing the electric field rather than the magnetic field. Moreover, other crystalline substrates may have different spin population orientations which may be harnessable similarly as to how the NV defects are harnessed to measure magnetic fields or electric fields. For instance, silicon carbide (SiC) has quantum defects which can be interrogated using electrically detected magnetic resonance (EDMR). This being said, NV defects may be preferred over silicon carbide for detecting the vector of a magnetic or electric field because the quantum defects of SiC have a single orientation in the matrix. Although there were not many candidates for an alternate substrate to NV centers at the time this specification was filed, the study of alternate quantum substrates was a very active field, and it is likely that suitable alternate quantum substrates exist and are simply waiting to be discovered and/or analysed more thoroughly. The method described herein can be used on such alternate quantum substrates if convenient once and when such substrates are discovered. For instance, while not having yet been the subject of much research, Hexagonal Boron Nitride is an emerging candidate which may well have quantum defects which will be harnessable in a manner similar to the way NV defects have been used in diamond substrates. The definition of the states between which spin populations are transferred can depend on the exact substrate which is used. It will also be noted that while initialization of the spin states (setting the states to a starting state) may often be considered essential before performing any state transfers and measurements, there may be some situations in which such initialization is not required, and this may be the case, for instance, in a situation where the crystalline matrix is close to 0 Kelvin at the time of taking the measurements. While NV defects are typically initialized in the $m_s=0$ state and then transferred to the $m_s=\pm-1$ states, there can be alternate scenarios where, for instance, the NV defects could be initialized in one or the other of the $m_s=\pm-1$ states and then transferred to another state and measured. Accordingly, the scope is indicated by the appended claims.

What is claimed is:

1. A vectorial magnetometer comprising:
   a structure having at least three spin populations, each spin population having a different characteristic orientation in the structure and being transferable from a first spin state to at least a second spin state by a transfer energy value which varies as a function of a trigonometrical projection of an ambient magnetic field on the characteristic orientation;
   a detector configured to measure an amplitude of a transfer of the spin state from the first spin state to at least the second spin state;
   an energy emitter configured to emit electromagnetic waves at varying energy values stimulating the transfer, and at varying sets of pulse parameters, the varying sets of pulse parameters having at least one of a varying pulse duration and a varying pulse amplitude to produce different, known proportions of Rabi attenuation of the stimulated transfer for the different characteristic orientations; and
   a controller configured to, for each one of at least three of the characteristic orientations, activate the energy emitter at at least one corresponding, distinct set of pulse parameters and measure an amplitude of a resulting spin population transfer with the detector, the controller further configured to determine the transfer energy value of the corresponding orientation based on the measured amplitude;
   wherein said determining includes distinguishing the amplitude associated specifically to each one of at least two of the characteristic orientations based on the known proportions of the Rabi attenuation in the different characteristic orientations when the transfer energy values of the at least two characteristic orientations coincide.

2. The vectorial magnetometer of claim 1 wherein a shortest pulse duration producing a zero Rabi attenuation on a given characteristic orientation is a π-pulse duration, wherein at least one of the distinct sets of pulse parameters has a duration greater than the π-pulse duration.

3. The vectorial magnetometer of claim 2 wherein the duration is an odd multiple of the π-pulse duration greater than 1 for the given characteristic orientation.

4. The vectorial magnetometer of claim 3 wherein the distinct sets of pulse parameters produce a Rabi attenuation greater than 30% for all characteristic orientations except one characteristic orientation, the one characteristic orientation changing from one set of pulse parameters to another.

5. The vectorial magnetometer of claim 1 wherein each distinct set of pulse parameters is configured to generate a significantly lesser Rabi attenuation for a given characteristic orientations than in the other orientations, the given characteristic orientation changing from one set of pulse parameters to another.

6. The vectorial magnetometer of claim 1 wherein said determining includes producing a system of equations including as many equations as unknown variables, and solving the system of equation for the unknown variables, wherein the unknown variables include the trigonometrical projection of the ambient magnetic field in each one of the at least three characteristic orientations.

7. The vectorial magnetometer of claim 6 wherein each equation includes a relationship between a change in detected amplitude for a corresponding transfer energy value shift for each individual characteristic orientation and the known proportions of Rabi attenuation of the stimulated transfer for the different characteristic orientations.

8. The vectorial magnetometer of claim 6 wherein the structure has at least four of said spin populations and characteristic orientations, and wherein the unknown variables further include a transfer energy value shift caused by a temperature variation.

9. The vectorial magnetometer of claim 1 wherein said distinguishing is further based on a known amplitude vs energy level profile for each one of the characteristic orientations stored in a computer readable memory accessible to the controller.

10. The vectorial magnetometer of claim 1 wherein the spin populations each form a ½ spin system, wherein the first spin state is $m_s=|0\rangle$ and the second spin state is $m_s=|+$ or $-1\rangle$.

11. The vectorial magnetometer of claim 10 wherein the structure is a diamond crystalline matrix and the spin populations are NV centers of corresponding ones of four characteristic orientations in the crystalline matrix.

12. The vectorial magnetometer of claim 1 wherein the energy emitter is a transfer energy emitter, further comprising a transition energy emitter configured to emit electromagnetic waves transitioning the spin populations from a base state to an excited state, the detector is configured to measure radiation stemming from a decay from the excited state to the base state, and wherein the controller is configured to activate the transition energy emitter before and after activating the transfer energy emitter for each measurement, in accordance with an optically detected magnetic resonance (ODMR) protocol.

13. The vectorial magnetometer of claim 12 wherein said activating the transition energy emitter before activating the transfer energy emitter includes activating the transition energy emitter after having previously activated the transfer energy emitter.

14. The vectorial magnetometer of claim 12 wherein the transfer energy emitter is a microwave emitter configured to propagate microwave electromagnetic waves in a straight waveguide oriented relative to the structure in a manner for the microwave electromagnetic waves to have a different trigonometrical projection on the different characteristic orientations.

15. The vectorial magnetometer of claim 12 wherein the transition energy emitter is a green laser.

16. The vectorial magnetometer of claim 1 wherein the distinct sets of pulse parameters have a same amplitude and a varying duration.

17. The vectorial magnetometer of claim 1 wherein, for each one of at least three of the characteristic orientations, a setpoint is determined at a maximum slope of the amplitude of the resulting spin population transfer.

18. A computer-implemented method of measuring an amplitude of a spin state transfer in a structure having spin populations having characteristic orientations in the structure and being transferable from a first spin state to a second spin state by energy at a transfer value, wherein the transfer value changes as a function of a trigonometrical projection of an external influence on the corresponding orientations, the method comprising:
  emitting electromagnetic waves of a frequency and with a set of pulse parameters, in a given orientation onto the spin populations in the structure, the pulse parameters comprising a pulse duration and a pulse amplitude,
    the frequency having an energy value corresponding to a difference between energy levels of first spin state and the second spin state for at least two of the spin population orientations;
    the pulse parameters attenuating a transfer stimulation effect of the frequency in different, known proportions in different ones of the at least two spin populations due to Rabi flopping and a difference between the given orientation and orientations of the different spin populations;
  measuring a total amplitude of a population transfer from the first spin state to the second spin state for said at least two spin populations due to said emitting;
  repeating said emitting and measuring for different sets of pulse parameters, the different sets of pulse parameters having at least one of the pulse duration and pulse amplitude being different, each set of pulse parameters producing different proportions of attenuation on a same spin population; and
  distinguishing an amplitude of population transfer specific to one of the at least two spin population based on the detected total amplitudes and the different, known proportions of attenuation for the different spin populations.

19. The computer-implemented method of claim 18 further comprising initializing the spin populations to the first spin state before each occurrence of emitting.

20. A computer program product stored in a non-transitory memory which, when executed by a processor, determines an amplitude of a spin state transfer in a structure having spin populations having characteristic orientations in the structure and being transferable from a first spin state to a second spin state by energy at a transfer value, wherein the transfer value changes as a function of a trigonometrical projection an external influence on the corresponding orientations, including
  accessing data corresponding to different total amplitude measurements of the population transfer from the first spin state to the second spin state for at least two spin populations due to:
    emitting electromagnetic waves of a given frequency in a pulse having a set of pulse parameters and in a given orientation onto the spin populations in the structure, the set of pulse parameters comprising a pulse duration and a pulse amplitude, the given frequency having an energy value corresponding to a difference between energy levels of first spin state and the second spin state for at least two of the spin population orientations, and thereby stimulating the transfer in said at least two spin populations; the set of pulse parameters attenuating a transfer stimulation effect of the frequency in different, known proportions in different ones of the at least two spin populations due to Rabi flopping, wherein an amplitude of the attenuation is different for the different ones of the at least two spin populations depending on a difference in orientation between an orientation of the electromagnetic waves and orientations of the at least two spin populations;

detecting a total amplitude of a population transfer from the first spin state to the second spin state in said at least two spin populations due to said emitting; and repeating the emitting to perform a sequence of measurements with pulses having different sets of pulse parameters, the different sets of pulse parameters having at least one of the pulse duration and pulse amplitude being different, yielding the different detected total amplitudes in the data; and distinguishing an amplitude of population transfer specific to one of the at least two spin population based on the detected total amplitudes and the different, known proportions of attenuation for the different spin populations.

21. The computer program product of claim 20 wherein said determining includes producing a system of equations including as many equations as unknown variables, and solving the system of equation for the unknown variables, wherein the unknown variables include a trigonometrical projection of an ambient magnetic field in each one of at least three characteristic orientations.

22. The computer program product of claim 21 wherein each equation includes a relationship between a change in detected amplitude for a corresponding transfer energy value shift for each individual characteristic orientation and the known proportions of Rabi attenuation of the stimulated transfer for the different characteristic orientations.

* * * * *